US00RE51044E

(19) United States
(12) Reissued Patent
Walk et al.

(10) Patent Number: US RE51,044 E
(45) Date of Reissued Patent: Sep. 29, 2026

(54) FILTRATION ASSEMBLY AND SYSTEM

(71) Applicant: Walk Industrial, Inc., Murrieta, CA (US)

(72) Inventors: Tyler G. Walk, Mattoon, IL (US); Mitch P. Walk, Temecula, CA (US)

(73) Assignee: WALK INDUSTRIAL, INC., Temecula, CA (US)

(21) Appl. No.: 18/229,497

(22) Filed: Aug. 2, 2023

Related U.S. Patent Documents

Reissue of:
(64) Patent No.: 11,291,941
Issued: Apr. 5, 2022
Appl. No.: 16/720,782
Filed: Dec. 19, 2019

U.S. Applications:
(63) Continuation of application No. 15/978,386, filed on May 14, 2018, now Pat. No. 10,758,857, which is a
(Continued)

(51) Int. Cl.
*B01D 46/24* (2006.01)
*B01D 46/00* (2022.01)
(Continued)

(52) U.S. Cl.
CPC ..... *B01D 46/2403* (2013.01); *B01D 46/0001* (2013.01); *B01D 46/2411* (2013.01);
(Continued)

(58) Field of Classification Search
CPC ..... B01D 46/64; B01D 46/645; B01D 2275/201; B01D 2275/206; B01D 46/521; B01D 46/0001; B01D 46/2411; B01D 46/2403; B05B 16/60; B05B 14/43; Y02P 70/10
See application file for complete search history.

(56) References Cited

U.S. PATENT DOCUMENTS 2,227,385 A 12/1940 Benedict
2,630,878 A 3/1953 Hopper et al.
(Continued)

FOREIGN PATENT DOCUMENTS

CN 102489075 A 6/2012
DE 272384 C 7/1912
(Continued)

OTHER PUBLICATIONS

International Search Report and Written Opinion for PCT/US2016/017330, Apr. 21, 2016, 13 pages.
(Continued)

*Primary Examiner* — Elizabeth L Mckane
(74) *Attorney, Agent, or Firm* — Stinson LLP

(57) ABSTRACT

A filter includes filter media and defines an inner plenum. The inner plenum has a cross-sectional dimension extending crosswise of the filter. The cross-sectional dimension decreases from adjacent the upstream side toward to downstream wall to a location disposed intermediate the upstream side and the downstream wall. The cross-sectional dimension of the inner plenum increases from adjacent the intermediate location toward the downstream wall.

15 Claims, 30 Drawing Sheets

Related U.S. Application Data continuation of application No. 15/729,750, filed on Oct. 11, 2017, now Pat. No. 9,968,878, which is a continuation of application No. 15/040,176, filed on Feb. 10, 2016, now abandoned.

(60) Provisional application No. 62/114,567, filed on Feb. 10, 2015.

(51) Int. Cl.
*B01D 46/52* (2006.01)
*B01D 46/64* (2022.01)

(52) U.S. Cl.
CPC ..... *B01D 46/521* (2013.01); *B01D 46/64* (2022.01); *B01D 2275/206* (2013.01)

(56) References Cited

U.S. PATENT DOCUMENTS

| | | | | |
|---|---|---|---|---|
| 3,075,337 | A | 1/1963 | Andreae | |
| 3,204,392 | A | 9/1965 | Schwab | |
| 3,309,848 | A | 3/1967 | Schwab | |
| 3,396,517 | A * | 8/1968 | Schwab | B01D 46/0043 55/380 |
| 3,438,180 | A | 4/1969 | Schwab | |
| 3,443,366 | A * | 5/1969 | Schwab | B01D 46/02 55/378 |
| 3,568,412 | A | 3/1971 | Schwab | |
| 3,796,024 | A | 3/1974 | Mier | |
| 3,853,510 | A * | 12/1974 | Meyer | B01D 46/02 55/484 |
| 4,008,060 | A | 2/1977 | Andreae | |
| 5,051,118 | A | 9/1991 | Andreae | |
| 5,607,735 | A | 3/1997 | Brown | |
| 5,690,710 | A | 11/1997 | Stephan | |
| 5,846,302 | A | 12/1998 | Putro | |
| 6,071,419 | A | 6/2000 | Beier et al. | |
| 6,136,058 | A | 10/2000 | Miller | |
| 6,159,316 | A | 12/2000 | Holt et al. | |
| 6,328,778 | B1 | 12/2001 | Richerson et al. | |
| 7,118,610 | B2 | 10/2006 | Lipner | |
| 7,309,372 | B2 | 12/2007 | Kahlbaugh et al. | |
| 7,314,497 | B2 | 1/2008 | Kahlbaugh et al. | |
| 7,727,915 | B2 | 6/2010 | Skirius et al. | |
| 7,758,666 | B2 | 7/2010 | Meerpohl | |
| 7,771,517 | B2 | 8/2010 | Dralle | |
| 8,021,455 | B2 | 9/2011 | Adamek et al. | |
| 8,021,457 | B2 | 9/2011 | Dema et al. | |
| 8,118,919 | B1 | 2/2012 | Love | |
| 8,268,033 | B2 | 9/2012 | Rogers et al. | |
| 8,641,796 | B2 | 2/2014 | Rogers et al. | |
| 8,764,871 | B2 | 7/2014 | Dralle | |
| 2002/0083692 | A1 | 7/2002 | Richerson et al. | |
| 2004/0088958 | A1 | 5/2004 | Richerson et al. | |
| 2007/0175193 | A1 | 8/2007 | Niakan | |
| 2010/0269468 | A1 | 10/2010 | Crabtree et al. | |
| 2014/0237957 | A1 | 8/2014 | Kohn et al. | |
| 2015/0367272 | A1 | 12/2015 | Morris | |

FOREIGN PATENT DOCUMENTS

| | | | |
|---|---|---|---|
| DE | 27 25 437 | A1 | 12/1978 |
| WO | 2015/128726 | A1 | 9/2015 |

OTHER PUBLICATIONS

European Extended Search Report for Application No. 16749791.6, Jan. 28, 2019, 10 pages.
International Search Report and Written Opinion for PCT/US2016/017330, dated Apr. 21, 2016, 13 pages.
Chemco Product Catalog. Chemco Manufacturing Company, Jan. 29, 2014, retrieved from the internet: <URL:hhtp://www.chemcomfg.com/files/chemco-catalog-2011-2012.pdf>.
European Extended Search Report for Application No. 16749791.6, dated Jan. 28, 2019, 10 pages.

* cited by examiner

FILTRATION ASSEMBLY AND SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. Non-provisional application Ser. No. 15/978,386, filed May 14, 2018, which is a continuation of U.S. Non-provisional application Ser. No. 15/729,750, filed Oct. 11, 2017, now issued U.S. Pat. No. 9,968,878, which is a continuation of U.S. Non-provisional application Ser. No. 15/040,176, filed Feb. 10, 2016, now abandoned, which claims the benefit of U.S. Provisional Application No. 62/114,567, filed Feb. 10, 2015, the entirety of each of which is hereby incorporated by reference.

FIELD OF THE DISCLOSURE

The field of the disclosure relates generally to filter assemblies for use in filtering particulate material from a flow.

BACKGROUND OF THE DISCLOSURE

Generally, filters have been fabricated to provide a single surface that facilitates filtration. As the single surface fills with particulate, the efficiency of the filter begins to decline. Accordingly, there is a need for a filter that is increases the useful life of known filters.

BRIEF DESCRIPTION OF THE DISCLOSURE

In one aspect, a filter assembly generally comprises a back wall comprising filter media and located on a downstream side. A first aperture is formed on an upstream side. The first aperture has a cross-sectional dimension. At least one sidewall comprising filter media. The at least one sidewall extends between the back wall and the first aperture; and a second aperture positioned between the first aperture and the back wall, the second aperture having a cross-sectional dimension, wherein the cross-sectional dimension of the second aperture is smaller than the cross-sectional dimension of the first aperture.

In another aspect, a filter assembly generally comprises a top surface comprising filter media. The top surface has at least one aperture extending through the top surface. The first aperture has a maximum cross-sectional dimension. A back surface comprises filter media. A middle filter media extends between the top surface and the back surface. A void is defined between the top surface and the back surface. The void has a maximum cross-sectional dimension. The maximum cross-sectional dimension of the void is larger than the maximum cross-sectional dimension of the first aperture.

In yet another aspect, a filter assembly generally comprises a housing. A first filter media layer is positioned within the housing, and further comprises a plurality of apertures formed through the first filter media layer. A second filter media layer is positioned within the housing. The first filter media layer is positioned at least partially over the second filter media layer such that a void is created between the first and second filter media layers.

In still another aspect, a filter generally comprises an upstream side defining a first aperture. A downstream wall comprises filter media. A length of the filter extending between the upstream side and the downstream wall. At least one side wall comprises filter media and extends lengthwise between the front side and the back wall. The front side, the downstream wall and the at least one side wall together define an inner plenum in flowable communication with the first aperture. The inner plenum has a cross-sectional dimension extending crosswise of the filter. The cross-sectional dimension decreases from adjacent the upstream side toward to downstream wall to a location disposed intermediate the upstream side and the downstream wall. The cross-sectional dimension of the inner plenum increases from adjacent the intermediate location toward the downstream wall.

The present disclosure has other aspects as described herein below.

DETAILED DESCRIPTION

Figure 1:
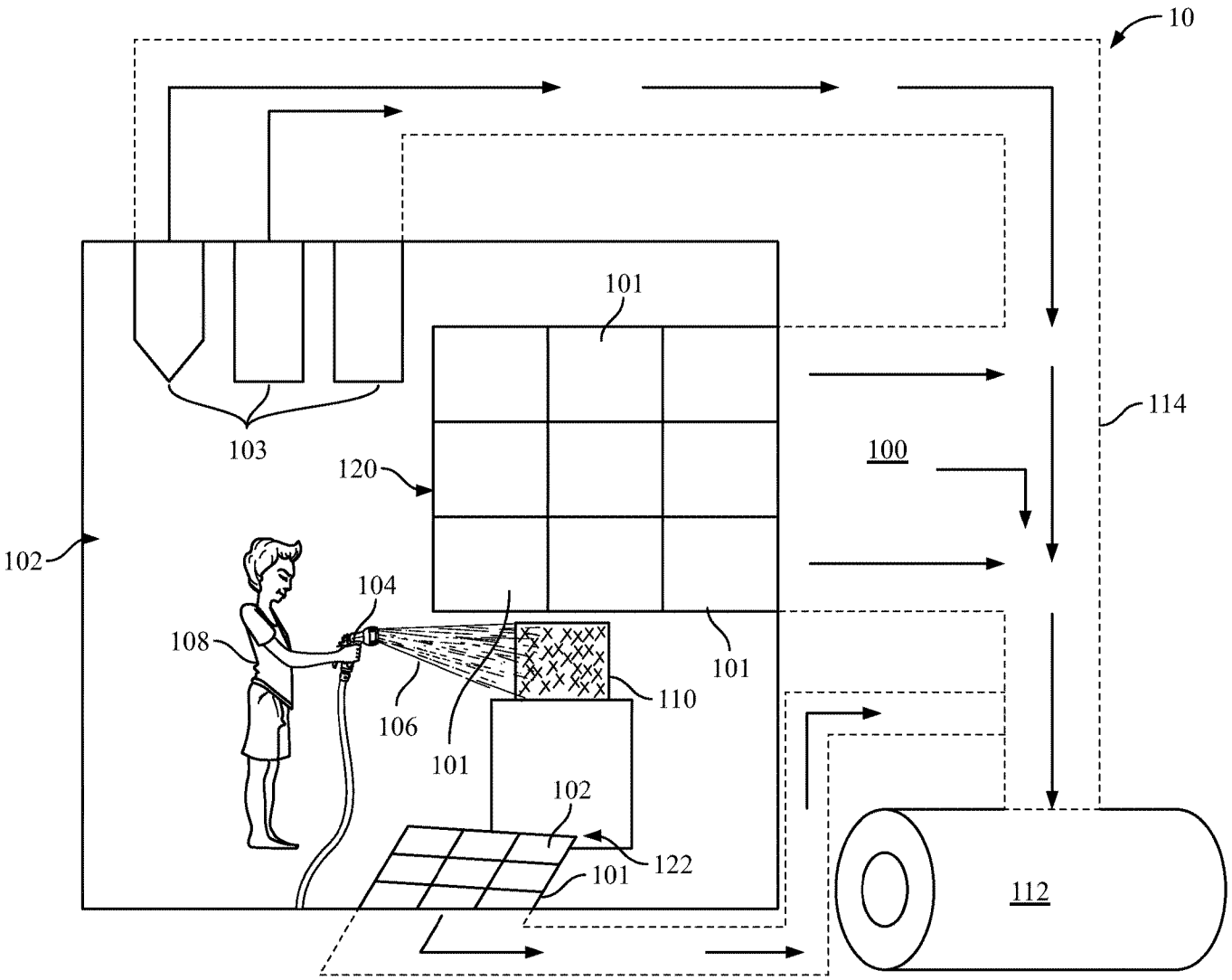
FIG. 1 is a schematic illustration of an exemplary filtration system.

Provided herein are embodiments of a filter for use in filtering a flowable substance (e.g., air, gas, fluid, and/or liquid) to remove unwanted material (e.g., particulate and/or contaminates) from the flowable substance. The filter embodiments described herein maximize the removal of particulate (e.g., paint, stains, dust/lint, pet dander, pollen, dust mite debris, mold spores, bacteria, microscopic allergens, virus carriers, smoke, odor, smog particles, metal, plastic, sludge, oil) from a flowable substance.

As used herein the term "filter media" refers to any material capable of removing particulate from a flowable substance (i.e., air/gas or fluid/liquid) including, but not limited to, polyester, thermal or resin bonded polyester, polypropylene, polyurethane, polyethylene, polyethylene foam, polyurethane foam, polyphenylene sulfide, polyolefin plastic, coal, glass, micro glass, spun glass, animal hair, organic fiber, fiberglass, acrylic fiber, paper, paper poly, cotton, nylon, Teflon, Aramid, felt, metal, fiber blend, wood, plastic, cardboard, or any combination thereof. In some embodiments, the filter media is electrostatic in that the filter media is configured to generate, produce, or hold an electrical charge that will facilitate the filter and/or filter media to attract, capture, and/or hold particulate. The filter media is fabricated to filter and/or trap particulate including, but not limited to, lint, pollen, dust mites, mold, bacteria, smoke, smog, and proplet nuceli. In some embodiments, the filter will have a tackifer or binder which will help hold particulates in suspension and will give the media a more uniform configuration enabling it to attract and/or hold unwanted particulates. Additionally, the filter media can have any MERV rating in the range of 1-16 that is determined for a particular application. The filter media described herein can be fabricated of a single layer of equal density, graduated density, or conformed density/shape or form (i.e., denier) or be fabricated from multiple layers of media such that the media is multi-denier or multi-staged. It should also be noted that any of the filters and/or filter media described herein can be finished to enhance the effectiveness of the filter media. The finishes can include, but are not limited to being, singed (open flame melting of one side of the media), glazed (heat melting of one side of the media), oleophobic (having a water and/or oil repellent finish), fire retardant, acid resistant, anti-static, mold/mildew resistant, moisture resistant, and microbial growth resistant or any combination thereof. In some embodiments, the filter media may be supported by a mesh, adhesive, or wiring to aid in the media maintaining shape as forces are exerted upon the media.

As used herein the terms "frame" or "filter frame" refer to a structure that supports the filter media. The "frame" or "filter frame" can be fabricated from any material capable of providing support (e.g., flexible or rigid) to the filter media, including, but not limited to, metal, wood, organic fiber, cotton, rubber, polymeric substance, and plastic or combination thereof.

As used herein, the terms "void," "cavity," "aperture," and "plenum" each refer, in general, to an empty space defined by a portion of filter media that is of sufficient size to allow some flowable substance to pass therethrough without filtering the desired particulate from the flowable substance. It should be noted that the "voids" or "cavities" are separate and apart from any spaces within a filter media that exists due to media formation (e.g., mesh or web of fibers), such as interfibrous space in the mesh or web of the media.

FIG. 1 is a schematic illustration of an exemplary filtration system 100. In the exemplary embodiment, system 100 includes a plurality of filters 101 constructed according to one or more teachings of the present disclosure. The filters 101 are positioned in a spray booth 102 having at least one ventilation system 104 for the removal of oversprayed coatings (e.g., paint, stain, powder) 106 from the air. In the exemplary embodiment, filtration system 100 is coupled in flowable communication with ventilation system 104 such that a downdraft and/or suction force provided by one or more motors or blowers 112 of ventilation system 104 forces air in booth 102 to move through filtration system 100. In one embodiment, filters 101 are coupled directly to a motor or blower 112 of ventilation system 104. Alternatively, filters 101 can be coupled to an air channel or duct 114 that is in flow communication with booth 102 and motor or blower 112.

In the exemplary embodiment, filtration system 100 includes a plurality of filters 101. Alternatively, system 100 can be a single filter 101 that is coupled to ventilation system 104. In some embodiments, filters 101 are configured in a grid, however, it should be noted that filters can be arranged in any orientation that facilitates filtration as described herein. In some embodiments, filters 101 are arranged on a wall as shown by grid 120, however, filters 101 can also be installed in the floor as shown by grid 122. In one embodiment, each filter 101 has a 20 inch by 20 inch (50.8 cm by 50.8 cm) square configuration. Alternatively, filters 101 can have any shaped configuration including, but not limited to rectangular, circular, and oval. Additionally, filters 101 can be fabricated to have any dimensions required by filtration system 100 and/or ventilation system 104. In the exemplary embodiment, filtration system 100 includes a frame configured to retain filters 101. In such an embodiment, filters 101 are positioned in the frame by sliding filters into the frame and filters 101 remain in place by a friction fit, for example. Alternatively, filters 101 can be coupled to filtration system 100 and/or the frame by strapping, clamping, cording, or locking filters 101 into place. The filters 101 can be arranged in other ways.

In some embodiments, as shown in FIG. 1, the filtration system 100 includes filters 103 that extend down into booth 102. Like filters 101, filters 103 are coupled to an air channel or duct 114 that is in flow communication with booth 102 and motor or blower 112 but could be coupled directly to a motor or blower 112 of ventilation system 104.

In the exemplary embodiment, a user 108 sprays a coating (e.g., paint or stain) 106 from a coating apparatus 105 to coat object 110. In some embodiments, coating apparatus 105 is an air spray gun; however, apparatus 105 can be any applicator that provides a coat to objects. Coatings 106 that do not attach or adhere to the surface of object 110 are forced through filtration system 100 and particulate in the air is substantially filtered out of the air as is passes through filters 101.

Figure 2:
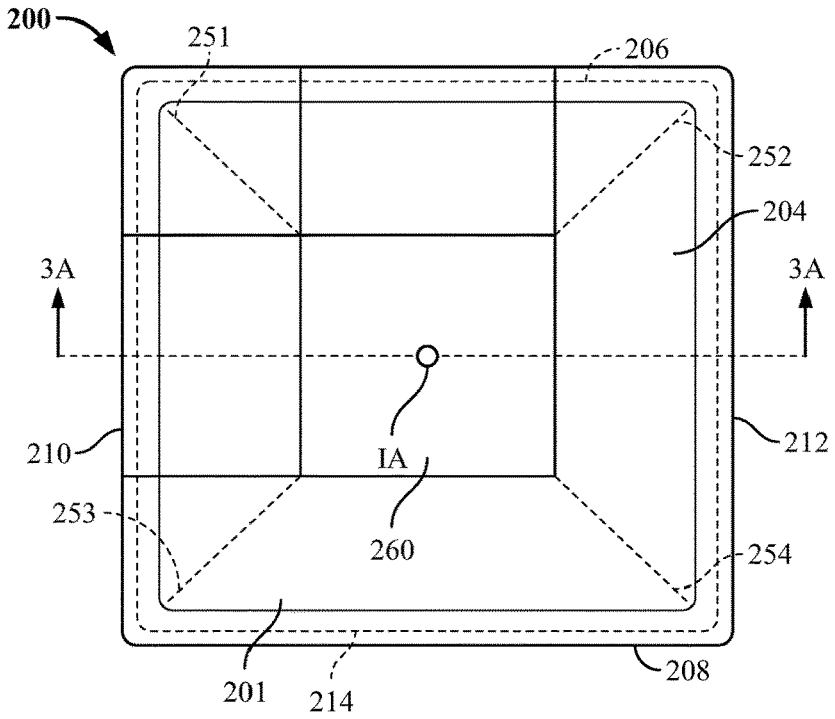
FIG. 2 is a front view of a filter for use with the filtration system shown in FIG. 1.
Figure 3:
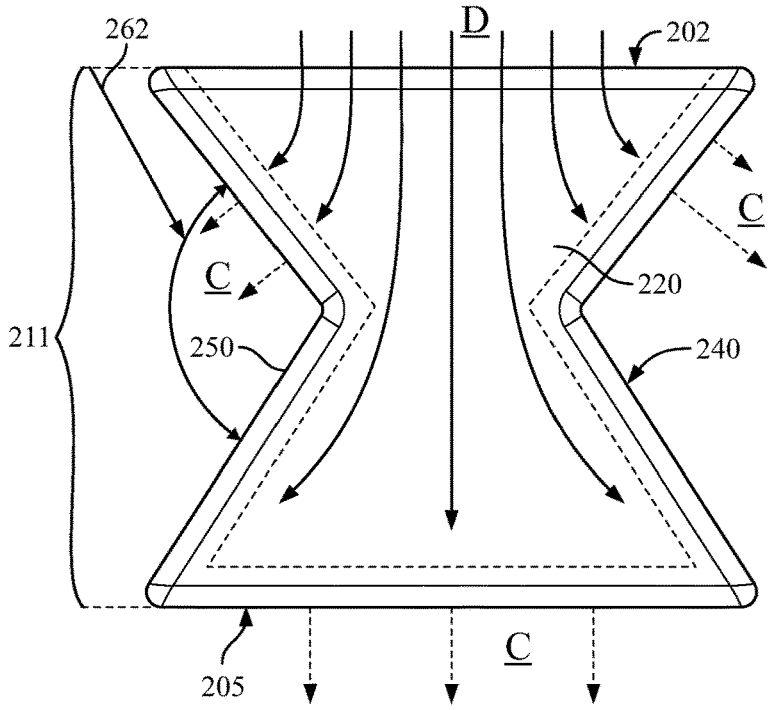
FIGS. 3, 4, and 5 are perspective views of the filter shown in FIG. 2.
Figure 3A:
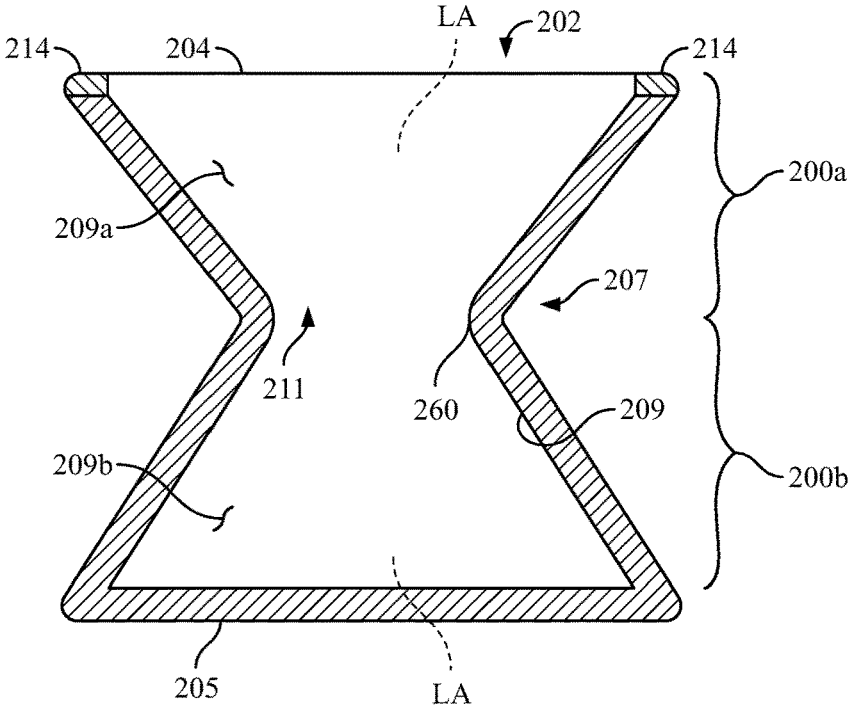
FIG. 3A is a longitudinal section of the filter in FIG. 2 taken in the plane defined by the line 3A-3A.
Figure 4:
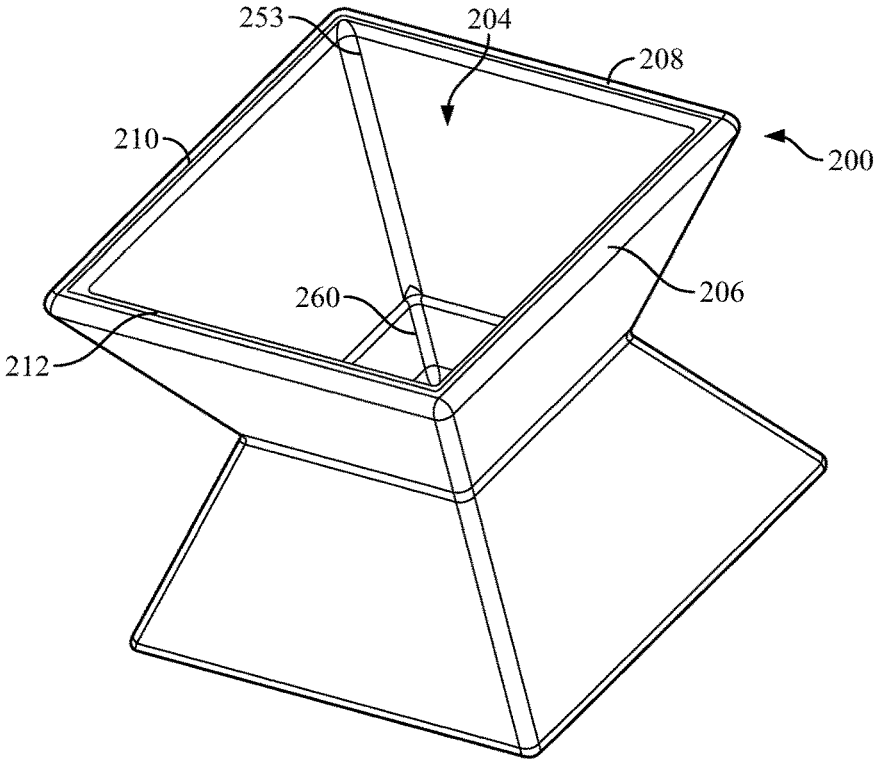
Figure 5:
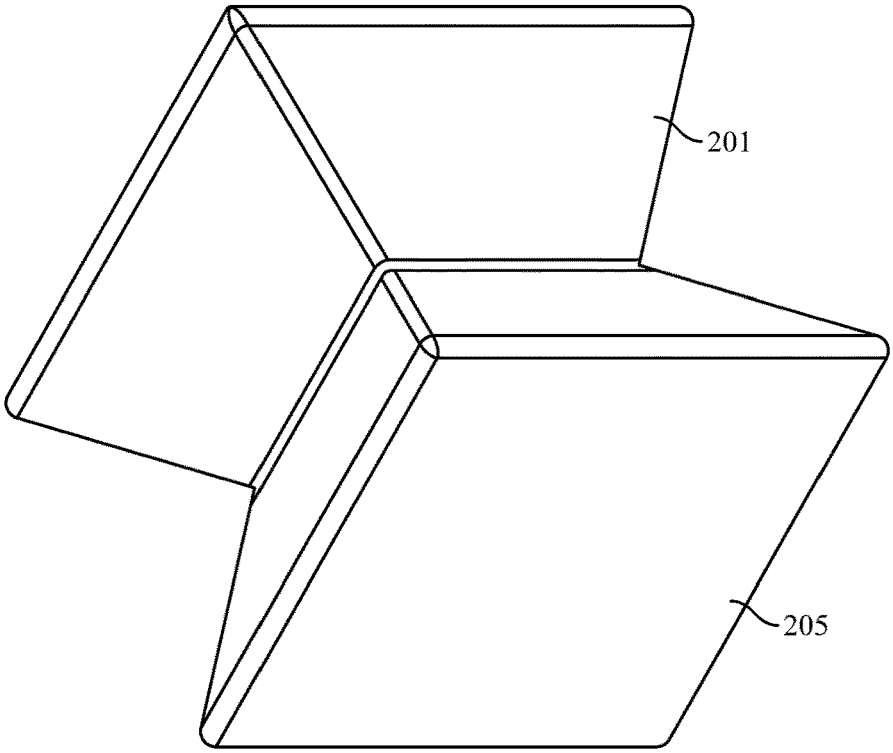

FIGS. 2, 3, 4, and 5 are illustrations of one embodiment of a filter 200 that is suitable for use with filtration system 100 shown in FIG. 1. FIG. 2 is a front view of filter 200, FIG. 3 is a top schematic view of filter 200, FIG. 4 is a first perspective view of filter 200, and FIG. 5 is a second perspective view of filter 200. In this embodiment, filter 200 comprises a filter body including a front side (i.e., an upstream side) 202 defining a first aperture 204, a back wall 205 (i.e., a downstream wall) at an opposite longitudinal end of filter, and at least one side wall 207 extending between front side and the back wall. Together front side 202, back wall 205, and at least one side wall 207 define a filter plenum 209 into which the flowable substance to be filtered flows. First aperture 204 is defined by a front top edge 206, a front bottom edge 208, a front first side edge 210, and a front second side edge 212 of front side 202. In the exemplary embodiment, back wall 205 and at least one side wall 207 (e.g., four side walls) comprise filter media 201 through which flowable substance may pass for filtering after entering filter plenum 209 through first aperture 204. Filter media 201 extends from back side wall 205 to front side 202 a distance 211. In the exemplary embodiment, distance 211 (i.e., depth of filter 200) is 17 inches (43.2 cm). However, distance 211 can be any distance that facilitates filtration as described herein. In the exemplary embodiment, filter media 201 has a thickness of 1.25 inches (3.18 cm), however, filter media 201 can have any thickness that facilitates filtration as described herein. It should be noted that the filter media 201 can include multiple stages and/or have multiple densities, graduated densities, binders, and tackifiers within the filter media 201.

In one or more embodiments, front side 202 includes a structural support (e.g., frame 214). In some embodiments, frame 214 is fabricated from a metal; however, frame 214 can be fabricated from any material that facilitates supporting filter media 201 and maintaining aperture 204 including but not limited to polymers, fiberglass, and alloys. In some embodiments, frame 214 includes at least one flat surface to enable filter 200 to substantially seal against filtration assembly 100. Alternatively, frame 214 can be fabricated in any manner that supports filter 200 and substantially seals against filtration assembly 100 such as, but not limited to, being fabricated from a tubular material, having rockers, and/or having chamfers. In one embodiment, frame 214 is positioned within or against back side 205 to maintain the form of back side 205. In the exemplary embodiment, first aperture 204 and/or frame 214 form a 20 inch by 20 inch (50.8 cm by 50.8 cm) square. However, frame 214 and or aperture 204 can have any size and shape configuration that facilitates filtration as described herein.

In the present embodiment, inner plenum 209 has a cross-sectional dimension (e.g., width) defined by an inner surface of the at least one side wall 207, for example. At least one cross-sectional dimension of inner plenum 209 decreases (e.g., tapers) from front side 202 toward back wall 205 to an intermediate location 213 between front side and back wall to define a front plenum section (i.e., upstream plenum section) 209a. In the illustrated embodiment, inner surface of each of the side walls defining the front plenum section 209a extends inward at an angle relative to a longitudinal axis LA of the filter. The cross-sectional dimension of inner plenum increases (e.g., flares) from intermediate location 213 toward (e.g., to) back wall 205 to define a rear plenum section (i.e., downstream plenum section) 209b. Intermediate location 213 defines a second aperture (or neck) 250 leading to rear (downstream) plenum section and flowably coupling front and rear plenum sections to one another. A cross-sectional area of first aperture 204 is greater than cross-sectional area of second aperture 260. For example, the cross-sectional area of first aperture 204 may be from about 0.5 times to about 20 times greater than cross-sectional area of second aperture 260. Thus, the illustrated inner plenum 209 has a generally hourglass shape (i.e., hourglass shape in longitudinal section). The filter also has an hourglass shape in longitudinal section. Plenum 209 and/or filter 200 may have other shapes without necessarily departing from the scope of the present invention.

In the illustrated embodiment, side wall 207 includes a top filter wall 220, a bottom filter wall 230, a first side filter wall 240, and a second side filter wall 250. In the exemplary embodiment, top filter wall 220 is coupled to first side filter wall 240 along seam 251 and coupled to second side filter wall 250 along seam 252. Likewise, bottom filter wall 230 is coupled to first side filter wall 240 along seam 253 and coupled to second side filter wall 250 along seam 254. Coupling adjacent walls (e.g., walls 220 and 240) forms second aperture (or neck) 260 and thus a void between front side 204 and back wall 205. In the exemplary embodiment, adjacent walls are coupled together along seams 251, 252, 253, and 254 for a length of 8.5 inches (21.6 cm) forming second aperture 260 to be 8 inches by 8 inches (20.32 cm by 20.32 cm). Additionally, coupling adjacent walls together along seams 251, 252, 253, and 254 for a length of 8.5 inches (21.6 cm) forms an aperture angle 262 on filter walls 220, 230, 240, and 250. In such an embodiment, aperture angle 262 is approximately 123°. Alternatively, walls 220, 230, 240, and 250 can be coupled together to form any sized second aperture 260 having any shape. As such, walls 220, 230, 240, and 250 can be coupled together such that one or more of seams 251, 252, 253, and 254 is a different length forming a rectangle in second aperture 262 and one or more different aperture angles 262.

In the exemplary embodiment, walls 220, 230, 240, and 250 are coupled to each other by stitching. However, it should be noted that walls 220, 230, 240, and 250 can be coupled in any manner that facilitates retaining filter media against itself including, but not limited to, heat staking, gluing, laminating, and ultrasonically welding. It should be noted that filter 200 can be fabricated from a single layer of filter media 201 to produce a filter without seams. Additionally, filter 200 can have any number of seams including, but not limited to, 1, 2, 3, 4, 5, and 6. Filter 200 is fabricated with filter media 201 to form walls 205, 220, 230, 240, and 250, having a particulate side 207 and a clean side 209.

In operation, particulate-laden (e.g., dirty) air flow D enters inner plenum 209 through first aperture 204 and clean air flow C is discharged through at least one of side wall 207 (e.g., filter walls 220, 230, 240, and 250) and back wall 205 towards motor or blower 112 (shown in FIG. 1). More specifically, particulate-laden flow D enters front plenum section 209a through first aperture 204 and particulate begins to accumulate on inner or particulate side 207 of walls 220, 230, 240, and 250 defining front plenum section (i.e., first or upstream filter body 200a). As such, filter media of first filter portion 200a acts as a first filter body that is upstream of back wall 205. It is believed that at this stage, most of the filtering is done by first filter body 200a. As particulate accumulates on particle side 207 of first filter body 200a, second aperture 260 begins to draw flow into second plenum portion 209b. As flow D enters second or downstream plenum section 209b through second aperture 260, the flow is redirected or spread across particulate side 207 of portions of walls 220, 230, 240, and 250 and back wall 205 defining second (or downstream) plenum portion 209b (i.e., second or downstream filter body 200b). In some embodiments, as particulate begins to accumulate on particulate side 207 of back wall 205 a loss of suction in will occur in the areas receiving particulate accumulation which will redirect flow D to a portion of back wall 205 having less accumulation.

Figure 6:
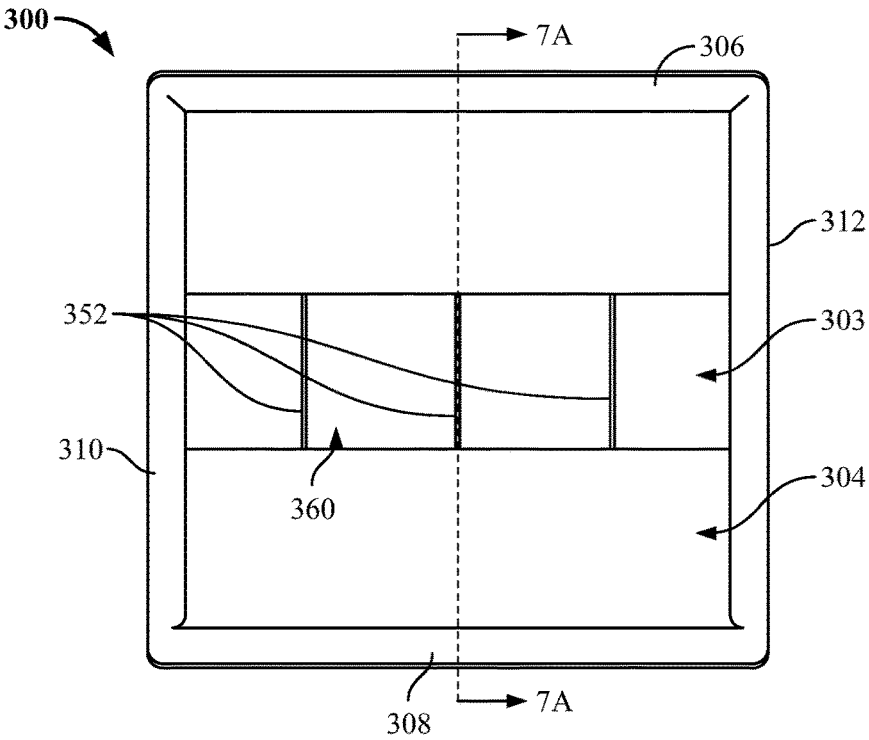
FIG. 6 is a front view of an alternative filter for use with the filtration system shown in FIG. 1.
Figure 7:
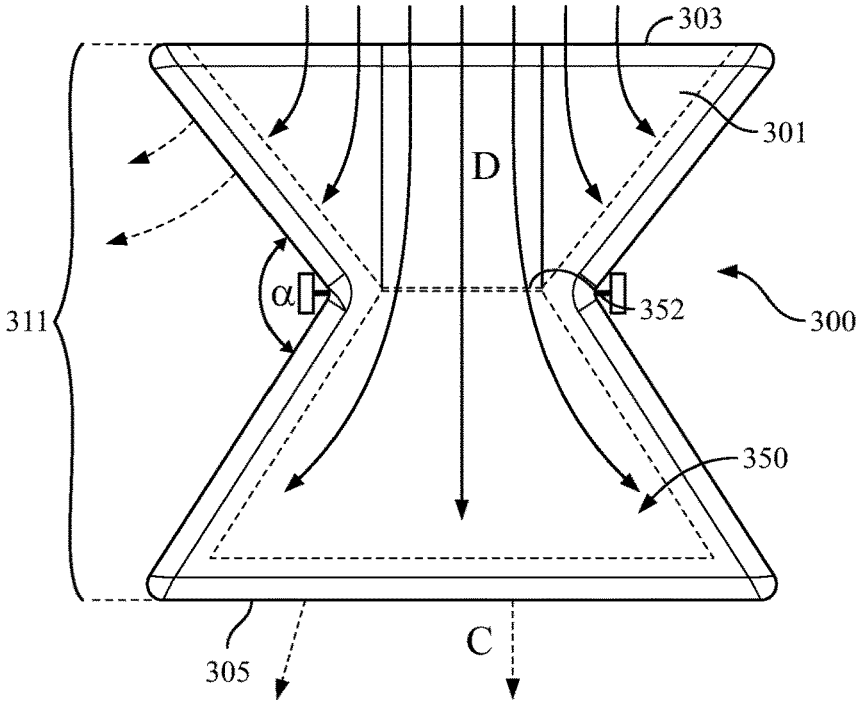
FIGS. 7, 8, and 9 are perspective views of the filter shown in FIG. 6.
Figure 7A:
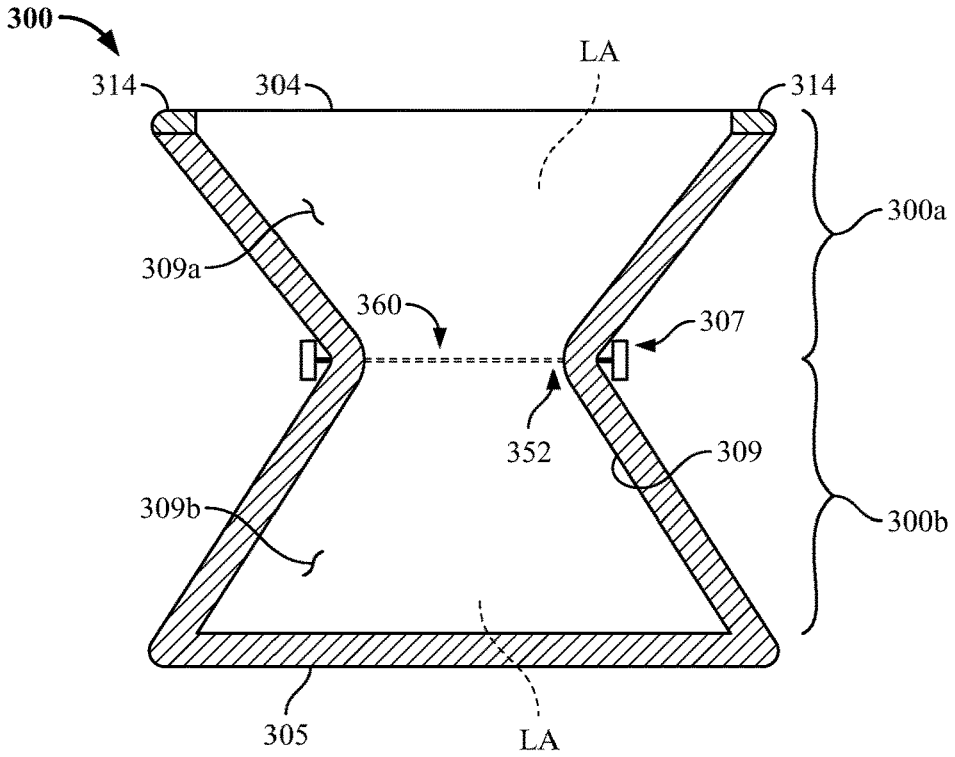
FIG. 7A is a longitudinal section of the filter in FIG. 6 taken in the plane defined by the line 7A-7A.
Figure 8:
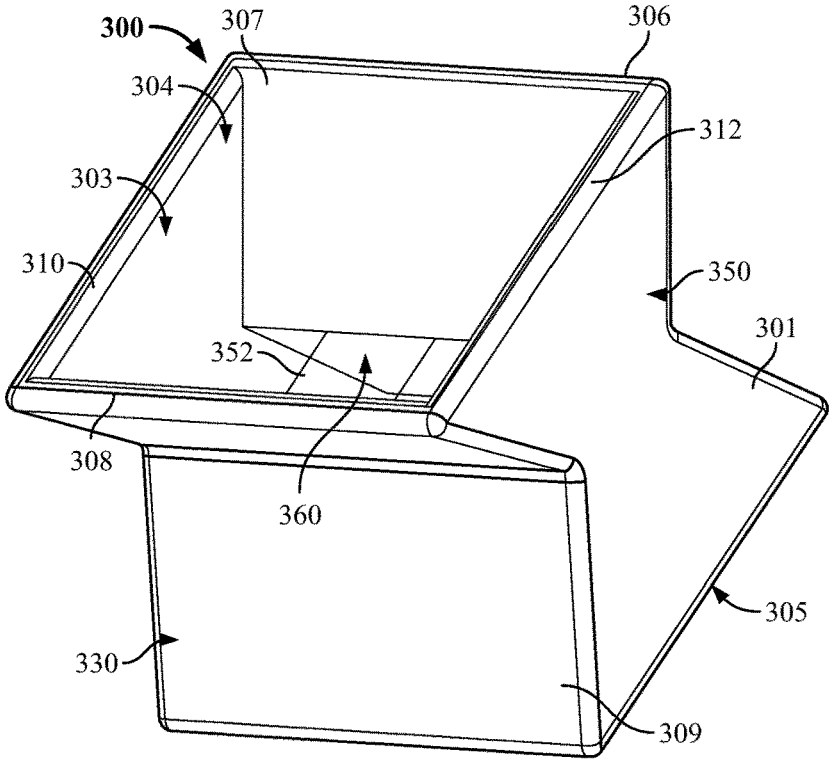
Figure 9:
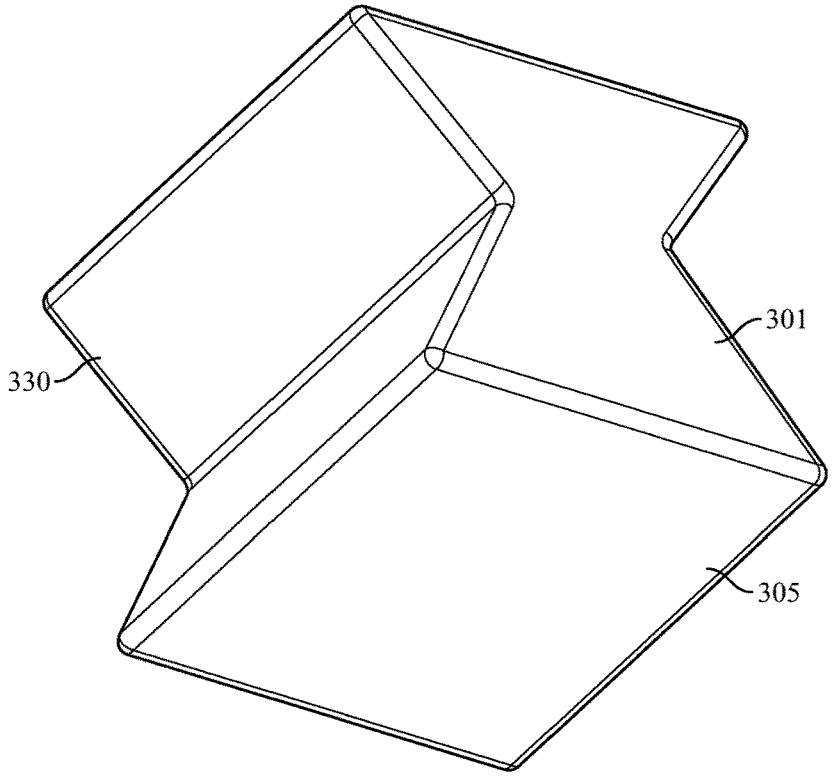

FIGS. 6, 7, 8, and 9 are illustrations of another embodiment of a filter 300 for use with filtration system 100 shown in FIG. 1. FIG. 6 is a front view of filter 300, FIG. 7 is a side schematic view of filter 300, FIG. 8 is a first perspective view of filter 300, and FIG. 9 is a second perspective view of filter 300. In the exemplary embodiment, filter 300 includes a front side 303 having a first aperture 304 and a back side wall 305. First aperture 304 is defined by a front top edge 306, a front bottom edge 308, a front first side edge 310, and a front second side edge 312. In the exemplary embodiment, filter media 301 extends from back side wall 305 to front side 303 a distance 311 and encloses a frame 314 to form first aperture 304. In the exemplary embodiment, distance 311 (i.e., depth of filter 300) is 17 inches (43.2 cm). However, distance 311 can be any distance that facilitates filtration as described herein.

In some embodiments, frame 314 is fabricated from a metal, however, frame 314 can be fabricated from any material that facilitates supporting filter media 301 and maintaining aperture 304 including but not limited to polymers, fiberglass, and alloys. In some embodiments, frame 314 is flat to enable filter 300 to substantially seal against filtration assembly 100. Alternatively, frame 314 can be fabricated in any manner that supports filter 300 and substantially seals against filtration assembly 100 such as, but not limited to, being fabricated from a tubular material, having rockers, and/or having chamfers. In one embodiment, frame 314 is positioned within or against back side 305 to maintain the form of back side 305. In the exemplary embodiment, first aperture 304 and/or frame 314 form a 20 inch by 20 inch (50.8 cm by 50.8 cm) square. However, frame 314 and or aperture 304 can have any size and shape configuration that facilitates filtration as described herein.

Filter 300 also includes a top filter wall 320, a bottom filter wall 330, a first side filter wall 340, and a second side filter wall 350. In the exemplary embodiment, a plurality of vanes 352 extend through filter media 301 from top filter wall 320 to bottom filter wall 330 to form a second aperture 360 in filter 300. In general, filter 300 is similar to filter 200. One main difference is only one cross-sectional dimension of inner plenum 309 decreases (e.g., tapers) from front side 302 toward back wall 305 to an intermediate location 313 between front side and back wall to define a front plenum section (i.e., upstream plenum section) 309a. In the illustrated embodiment, inner surface of only one pair of opposing the side walls partially defining the front plenum section 309a extends inward at an angle relative to a longitudinal axis LA of the filter. Moreover, only one cross-sectional dimension of inner plenum increases (e.g., flares) from intermediate location 313 toward (e.g., to) back wall 305 to define a rear plenum section (i.e., downstream plenum section) 309b. Intermediate location 313 defines a second aperture (or neck) 350 leading to rear plenum section and flowably coupling front and read plenum sections to one another. A cross-sectional area of first aperture 304 is greater than cross-sectional area of second aperture 360. For example, the cross-sectional area of first aperture 304 may be from about 0.5 times to about 20 times greater than cross-sectional area of second aperture 360. Thus, the illustrated inner plenum 309 and filter 300 has a generally hourglass shape in cross section taken in only one cross-sectional plane. Plenum and/or filter may have other shapes without necessarily departing from the scope of the present invention.

In one embodiment, fasteners (e.g., vanes 352) fasten opposing side walls 307 at or near the intermediate location (e.g., midpoint of length 311) to form the hourglass shape in cross section. In some embodiments, vanes 352 are fabricated from a substantially slippery (e.g., lubricious) material that generally resists adherence to particulate (e.g., paint, stain, dust, dirt) including, but not limited to, nylon, polyvinylidene fluoride, polyethylene, Dacron, and Dyneema. In the exemplary embodiment, fasteners (e.g., vanes) 352 extend for a length of 6 inches (15.24 cm) forming the second aperture 360 to be approximately a 20 inch by 2 inch (50.8 cm by 5.08 cm) rectangle. Additionally, the use of 5 inch (12.7 cm) vanes 352 at the midpoint of length 311 forms an aperture angle $\alpha$ on filter walls 320 and 330. In such an embodiment, aperture angle $\alpha$ is approximately 109°. Alternatively, vanes 352 can have any length and be positioned at any location along length 311 of filter 300 to form any sized second aperture 360 having any shape. In some embodiments, vanes 352 are positioned between walls 320 and 330 as well as between walls 340 and 350 to form a filter similar in shape to that shown in FIGS. 2-5.

In operation, particulate-laden (e.g., dirty) air flow D enters inner plenum 309 through first aperture 304 and clean air flow C is discharged through at least one of side wall 307 (e.g., filter walls 320, 330, 340, and 350) and back wall 305 towards motor or blower 112 (shown in FIG. 1). More specifically, particulate-laden flow D enters front plenum section 309a through first aperture 304 and particulate begins to accumulate on inner or particulate side 307 of walls 320, 330, 340, and 350 defining front plenum section (i.e., first or upstream filter body 300a). As such, filter media of first filter portion 300a acts as a first filter body that is upstream of back wall 305. It is believed that at this stage, most of the filtering is done by first filter body 300a. As particulate accumulates on particle side 307 of first filter body 300a, second aperture 360 begins to draw flow into second plenum portion 309b. As flow D enters second or downstream plenum section 309b through second aperture 360, the flow is redirected or spread across particulate side 307 of portions of walls 320, 330, 340, and 350 and back wall 305 defining second (or downstream) plenum portion 309b (i.e., second or downstream filter body 300b). In some embodiments, as particulate begins to accumulate on particulate side 307 of back wall 305 a loss of suction in will occur in the areas receiving particulate accumulation which will redirect flow D to a portion of back wall 305 having less accumulation.

Figure 10:
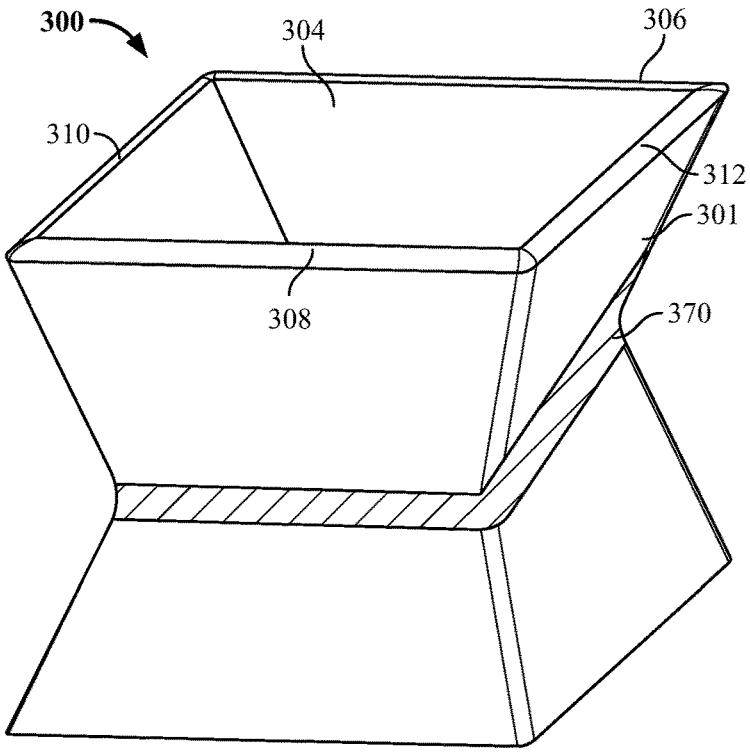
FIGS. 10 and 11 are perspective views of an alternative embodiment of the filter shown in FIG. 6.
Figure 11:
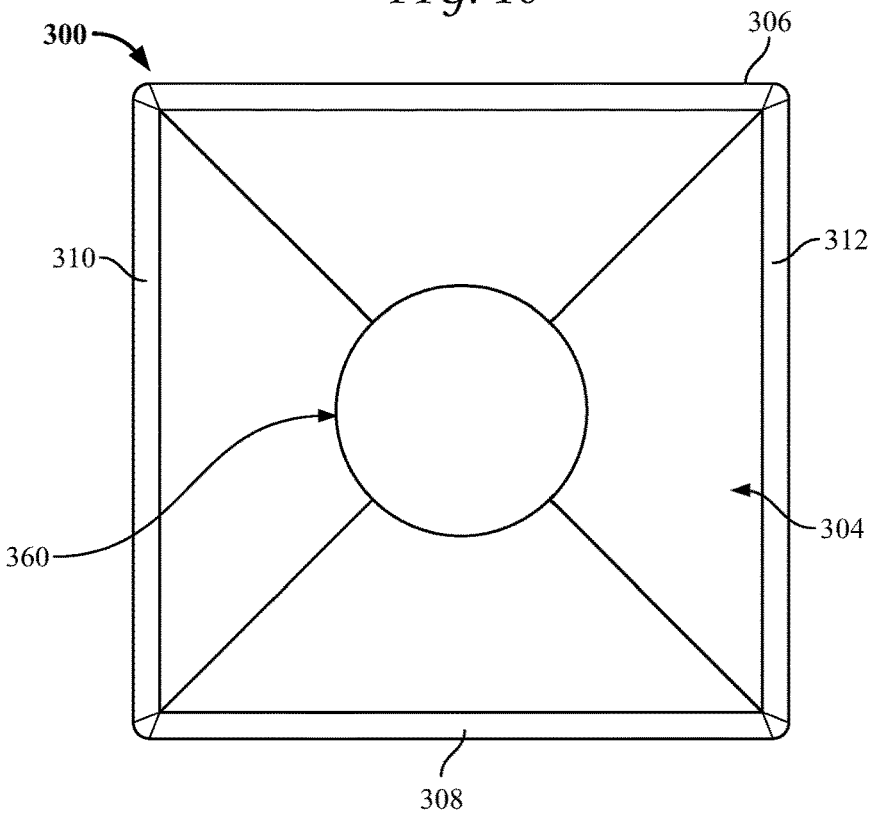
Figure 11A:
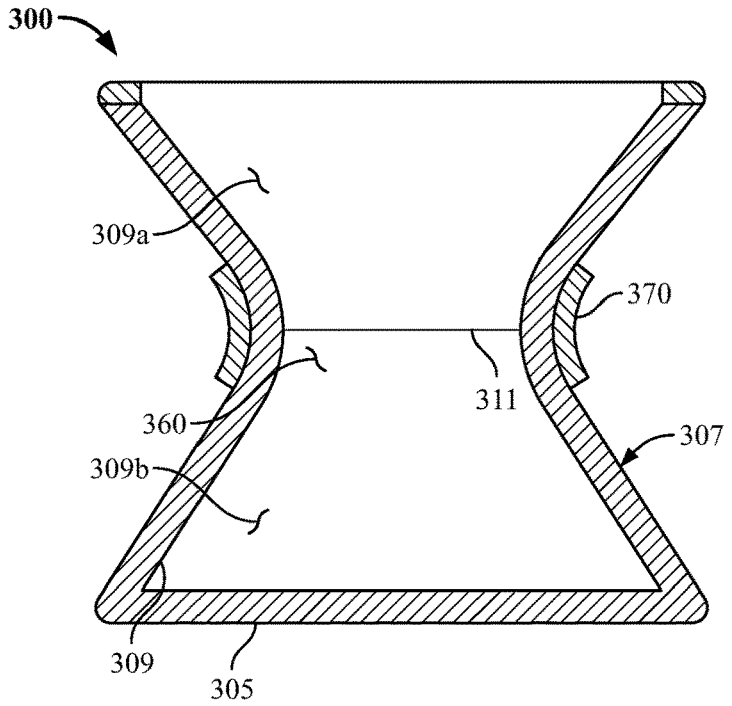
FIG. 11A is a longitudinal section of the filter in FIG. 10 taken in the plane defined by the line 11A-11A.

In one embodiment, as shown in FIGS. 10 and 11, vanes 352 of filter 300 are replaced with a band 370 positioned around clean side 309 of filter 300. In such an embodiment, band 370 extends around side wall 307 of filter 300 to decrease the cross-sectional dimensions at the intermediate location 311 to form second aperture 360 into a substantially circular shape. However, band 370 can be positioned around filter 300 to form second aperture 360 into any shape that facilitates filtration as described herein including, but not limited to, square, oval, diamond, star, and rectangular. In one embodiment band 370 is formed from a flexible material such as, but not limited to, rubber, nylon, elastomers, polyphenylene sulfide, animal hair, cotton, felt, organic fiber, isoprene, polymers, polyvinylidene fluoride, metal, polyethylene, paper, polyurethane, glue, Dacron, and Dyneema. Alternatively, band 370 can be formed of a substantially rigid material that enables second aperture 360 to be formed into predetermined shapes by having band 370 substantially maintain form including, but not limited to, metal, wood, glue, animal hair, organic fiber, cotton, felt, and plastic.

Figure 12:
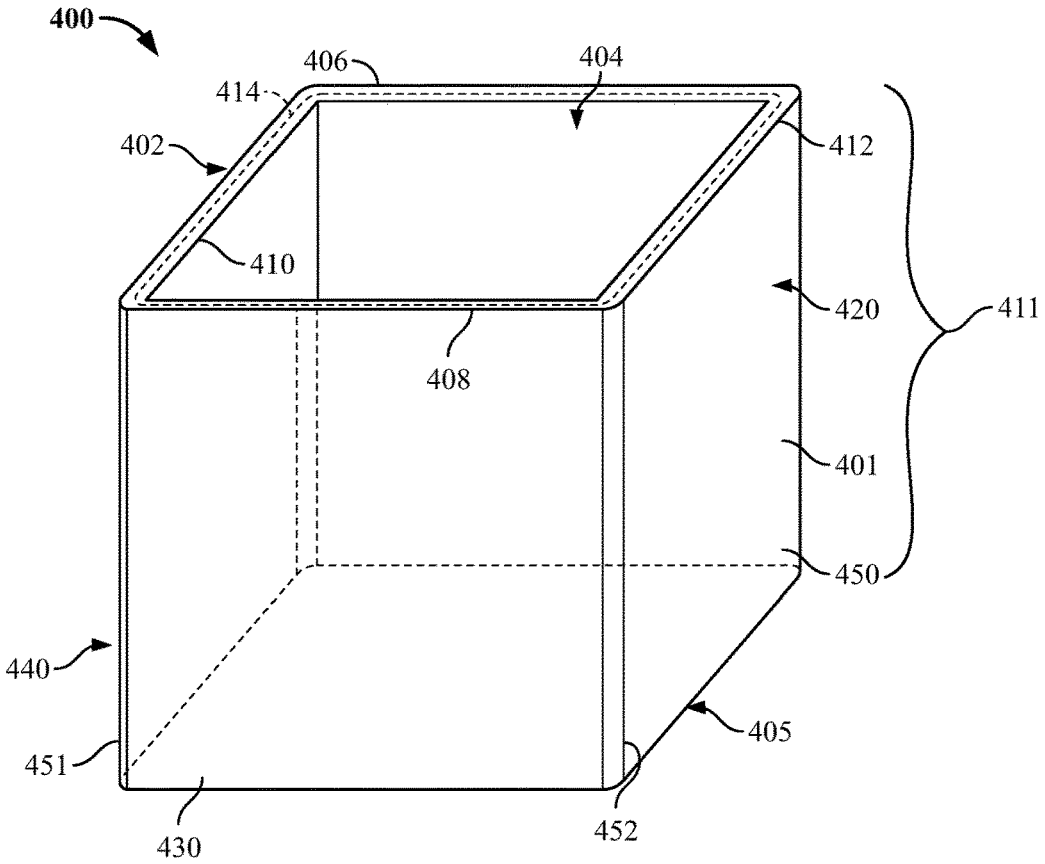
FIG. 12 is a perspective view of an alternative filter for use with filtration system shown in FIG. 1.

FIG. 12 is a perspective view of an alternative filter 400 for use with filtration system 100 shown in FIG. 1. In the exemplary embodiment, filter 400 includes a front side 402 having a first aperture 404 and a back wall 405. First aperture 404 is defined by a front top edge 406, a front bottom edge 408, a front first side edge 410, and a front second side edge 412. In the exemplary embodiment, filter media 401 extends from back side wall 405 to front side 402 a distance 411 and encloses a frame 414 to form first aperture 404. In the exemplary embodiment, distance 411 (i.e., depth of filter 400) is 17 inches (43.18 cm). However, distance 411 can be any distance that facilitates filtration as described herein. In the exemplary embodiment, filter media 401 has a thickness of 1.25 inches (3.175 cm), however, filter media 401 can have any thickness that facilitates filtration as described herein. It should be noted that the filter media 401 can include multiple stages and/or have multiple densities and/or graduated within the filter media 401.

In some embodiments, frame 414 is fabricated from a metal, however, frame 414 can be fabricated from any material that facilitates supporting filter media 401 and maintaining aperture 404 including but not limited to polymers, fiberglass, and alloys. In some embodiments, frame 414 includes at least one flat surface to enable filter 400 to substantially seal against filtration assembly 100. Alternatively, frame 414 can be fabricated in any manner that supports filter 400 and substantially seals against filtration assembly 100 such as, but not limited to, being fabricated from a tubular material, having rockers, and/or having chamfers. In one embodiment, frame 414 is positioned within or against back side 405 to maintain the form of back side 405. In the exemplary embodiment, first aperture 404 and/or frame 414 form a 20 inch by 20 inch (50.8 cm by 50.8 cm) square. However, frame 414 and/or aperture 404 can have any size and shape configuration that facilitates filtration as described herein.

Filter 404 also includes a top filter wall 420, a bottom filter wall 430, a first side filter wall 440, and a second side filter wall 450. In the exemplary embodiment, bottom filter wall 430 is coupled to first side filter wall 440 along seam 451 and coupled to second side filter wall 450 along seam 452. In the exemplary embodiment, adjacent walls can be coupled together by stitching. However, it should be noted that walls 420, 430, 440, and 450 can be coupled in any manner that facilitates retaining filter media against itself including, but not limited to, heat staking, gluing, laminating, stitching, and ultrasonically welding. It should be noted that filter 400 can be fabricated from a single layer of filter media 401 to produce a filter without seams. Additionally, filter 400 can have any number of seams including, but not limited to, 1, 2, 3, 4, 5, and 6. Filter 400 is fabricated with filter media 401 to form walls 405, 420, 430, 440, and 450, having a particulate side and a clean side.

In operation, particulate-laden air flow D enters first aperture 404 and clean air flow C is discharged through back wall 405. More specifically, particulate-laden flow D enters first aperture 404 and particulate begins to accumulate on particulate side 207 of wall 450.

Figure 13:
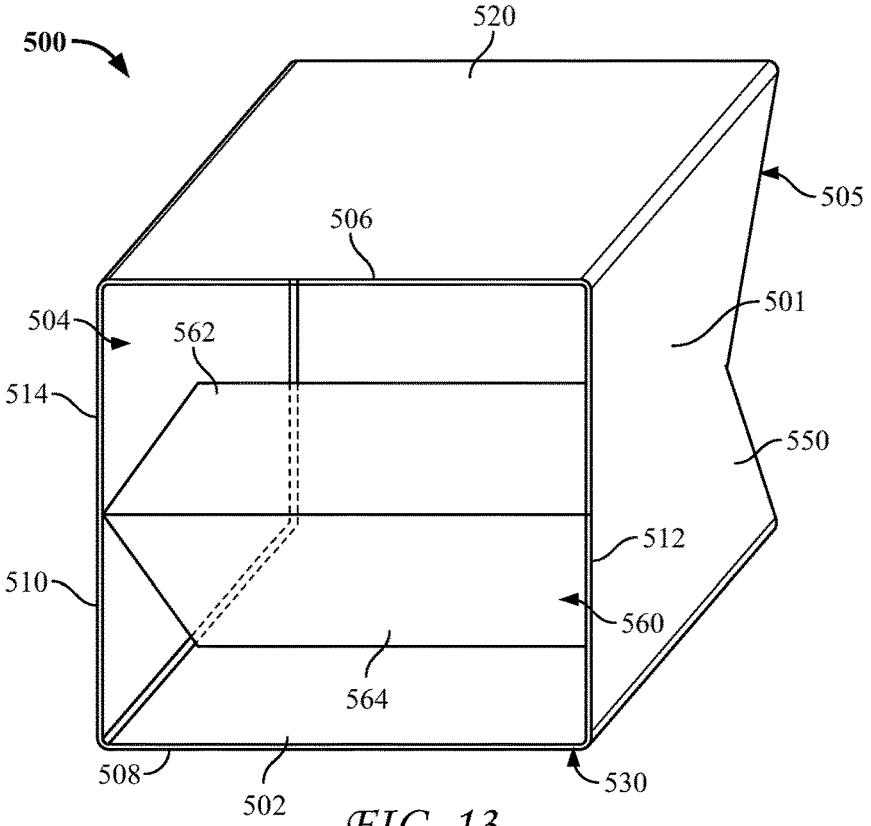
FIG. 13 is a front view of an alternative filter for use with the filtration system shown in FIG. 1.
Figure 14:
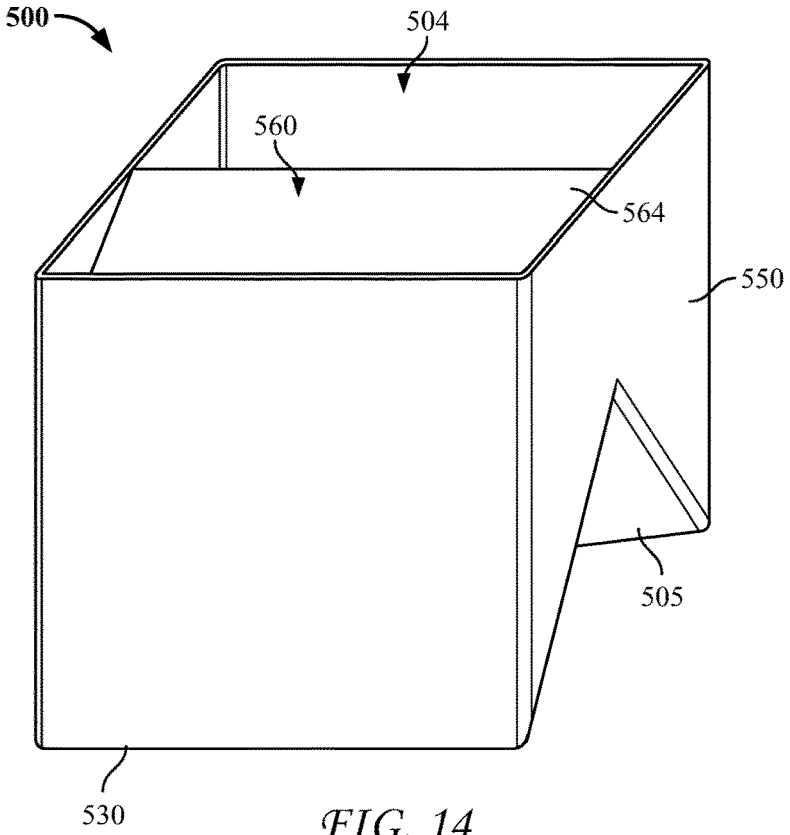
FIGS. 14 and 15 are perspective views of the filter shown in FIG. 13.
Figure 15:
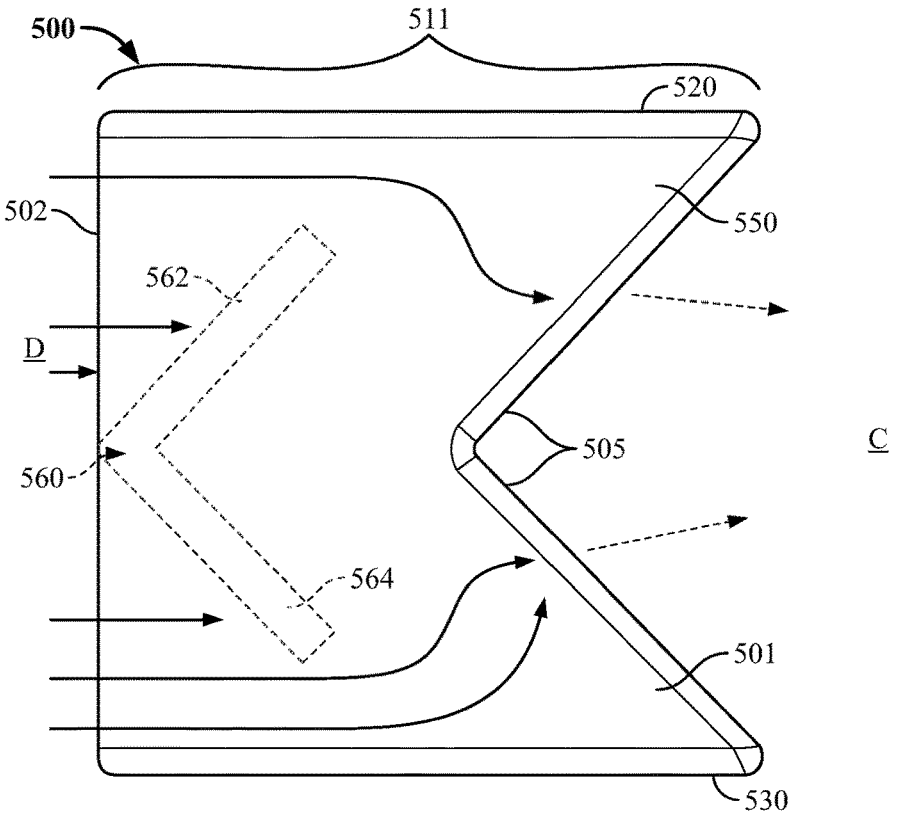

FIGS. 13, 14, and 15 are illustrations of an alternative filter 500 for use with filtration system 100 shown in FIG. 1. FIG. 13 is a front perspective view of filter 300, FIG. 14 is a bottom perspective view of filter 500, and FIG. 15 is a side schematic view of filter 500. In the exemplary embodiment, filter 500 includes a front side 502 having a first aperture 504 and a back side wall 505. First aperture 504 is defined by a front top edge 506, a front bottom edge 508, a front first side edge 510, and a front second side edge 512. In the exemplary embodiment, filter media 501 extends from back side wall 505 to front side 502 a distance 511 and encloses a frame 514 to form first aperture 504. In the exemplary embodiment, distance 511 (i.e., depth of filter 500) is 17 inches (43.2 cm). However, distance 511 can be any distance that facilitates filtration as described herein.

In some embodiments, frame 514 is fabricated from a metal, however, frame 514 can be fabricated from any material that facilitates supporting filter media 501 and maintaining aperture 504 including but not limited to polymers, fiberglass, and alloys. In some embodiments, frame 514 is flat to enable filter 500 to substantially seal against filtration assembly 100. Alternatively, frame 514 can be fabricated in any manner that supports filter 500 and substantially seals against filtration assembly 100 such as, but not limited to, being fabricated from a tubular material, having rockers, and/or having chamfers. In one embodiment, frame 514 is positioned within or against back side 505 to maintain the form of back side 505. In the exemplary embodiment, first aperture 504 and/or frame 514 form a 20 inch by 20 inch (50.8 cm by 50.8 cm) square. However, frame 514 and or aperture 504 can have any size and shape configuration that facilitates filtration as described herein.

Filter 500 also includes a top filter wall 520, a bottom filter wall 530, a first side filter wall 540, and a second side filter wall 550. In the exemplary embodiment, filter 500 includes a divider surface 560 that has a first flange 562 and a second flange 564. Divider surface 560 is fabricated from filter media 501. In one embodiment, divider surface 560 is fabricated with frame 514 supporting surface 560. In some embodiments, frame 514 supporting surface 560 is coupled to frame 514 which supports and maintains aperture 504. Alternatively, surface 560 can be fabricated independently of filter 500 and be coupled (e.g., stitching, heat staking, gluing, laminating, and ultrasonically welding) to filter 500 after or during the fabrication of walls 520, 530, 540, and 550.

In the exemplary embodiment, back wall 505 is fabricated in a concave manner to form a V-shape. Such a shape of back wall 505 can enable a more efficient stacking of filters to provide a more economical and efficient shipping of a plurality of filters. Alternatively, back wall 505 can have any shape that facilities filtration as described herein including being substantially planar (e.g., flat) as shown in filters described above. Also, it should be noted that any of the filters described above can be fabricated to have a back wall that is substantially or fully in a concave or convex shape to increase the efficacy of the filter. Additionally, the construct of the filters described above having a second aperture enables the filter to be compressed from the filter's initial construct to enable a more efficient stacking of filters to provide a more economical and efficient shipping of a plurality of filters.

In the exemplary embodiment, filter media 501, and thus walls 505, 520, 530, 540, and 550, has a particulate side 507 and a clean side 509. In operation, particulate-laden air flow D enters first aperture 304 and clean air flow C is discharged through back wall 505. More specifically, particulate-laden flow D enters first aperture 504 and particulate begins to accumulate on particulate side 507 of surface 560. As surface 560 begins to accumulate particulate, air flow D is redirected around divider 560 and distributed throughout particulate side 507 of back wall 505. As such, surface 560 acts as a pre-filter before air flow D contacts back wall 505.

It should be noted that the frames (e.g., 214 and 314) described above within filters can be positioned within a mating section (e.g., first apertures 204 and 304) or within more sections of the filters to provide structural support of a desired shaped of the filter. For example, frames can be positioned along the back walls (e.g., 205 and 305) to maintain a substantially square shape. Additionally, frames can extend between mating sections and back walls to maintain desired shapes of the filters, such as those shown in FIGS. 2-13. In some embodiments, frames having a predetermined shape can be provided and filter media can be wrapped around the frame to form a filter. In such an embodiment, a back wall can be positioned on the frame and/or filter media and the back wall and wrapped filter media can be secured together by techniques described above (e.g., heat staking, stitching, gluing, laminating, and ultrasonically welding) to complete the filter. It should also be noted that filters shown in FIGS. 2-13 can be fabricated without a frame such that the filter is supported by or within a filter retainer and/or retention system (e.g., grid 120).

Each of the filters described herein can include a front filter or pre-filter to enhance the efficacy of the filter. As such, FIGS. 16-39 illustrate exemplary embodiments of front filters for use with the filters described above. For ease of reference, each front filter will be shown in a front view with a cube filter, such as filter 400 shown in FIG. 12, with shading to represent the back wall (e.g., 405) of the filter. A side view of the front filter will also be depicted with a cube filter, such as filter 400 shown in FIG. 12, and a bowtie or pyramid filter, such as filters 200 and 300 shown in FIGS. 2-11, to illustrate airflow with each front filter. In some embodiments, the filter media utilized with the front filter differs from the rest of the filter in at least one of density, material, and/or layers. Alternatively, in some embodiments, the filter media of the front filter is substantially the same as that used in the rest of the filter.

As noted above, the front filters or pre-filters 600, 610, 620, 630, 640, 650, 660, and 670 shown in FIGS. 16-39 can be utilized with any of the filters shown in FIGS. 2-15. In the exemplary embodiment, the front filters 600, 610, 620, 630, 640, 650, 660, and 670 are fixedly coupled to the filter in a manner described above (e.g., stitching, heat staking, gluing, laminating, and ultrasonically welding). In some embodiments, front filters 600, 610, 620, 630, 640, 650, 660, and 670 incorporate a frame that is coupled to the frame of the filter. Alternatively the front filters 600, 610, 620, 630, 640, 650, 660, and 670 may have a support frame that is integrally formed within the front filter. In some embodiments, the font filters 600, 610, 620, 630, 640, 650, 660, and 670 are removably coupled to the filter to enable replacement and/or cleaning without requiring the entire assembly to be removed. In such an embodiment, the front filter 600, 610, 620, 630, 640, 650, 660, and 670 is removably coupled with a hook and loop fastening system. Alternatively, the front filters can be removably coupled in any manner that secures the front filter to one the filters described herein including, but not limited to being secured by a magnet, electromagnet, snap, button, zipper, and latch.

It should be noted that the front filters 600, 610, 620, 630, 640, 650, 660, and 670 described below are merely for illustrative purposes and can be altered in size, direction, orientation, and/or positioning to create a desired effect. For example, apertures formed by front filters 600, 610, 620, 630, 640, 650, 660, and 670 can change in size to comply with the requirements of a desired application (e.g., spray booth, home HVAC, commercial HVAC). To this end, an aperture formed in a substantially rectangular shape can be modified to be formed in other shapes including but not limited to, circular, square, oval, octagonal, and triangular. Additionally, the number of apertures can be altered such that an embodiment with four apertures can be modified to having any number of apertures including, but not limited to 1, 2, 3, 4, 5, 6, 7, and 8.

Figure 16:
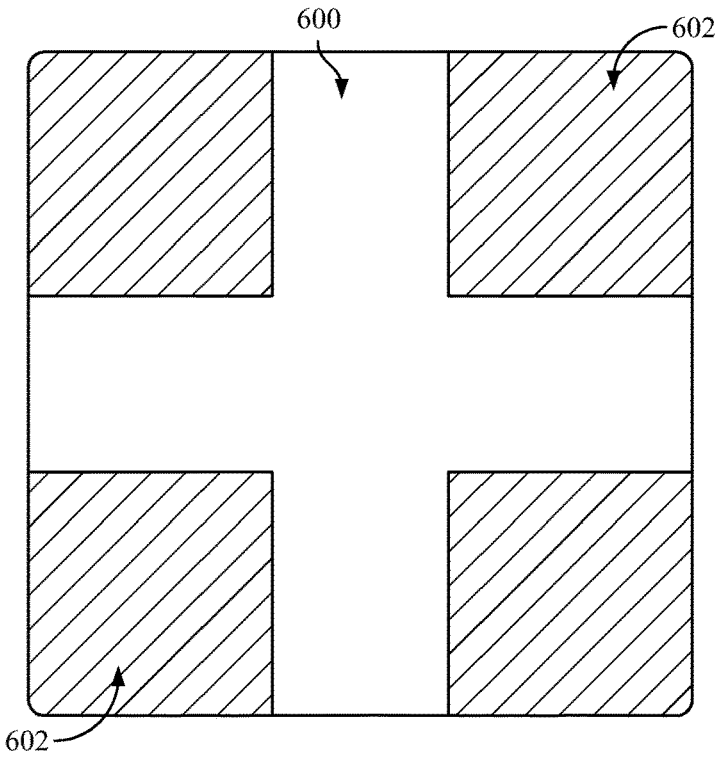
FIGS. 16 and 17 are perspective views of a front filter used with the filter shown in FIG. 12.
Figure 17:
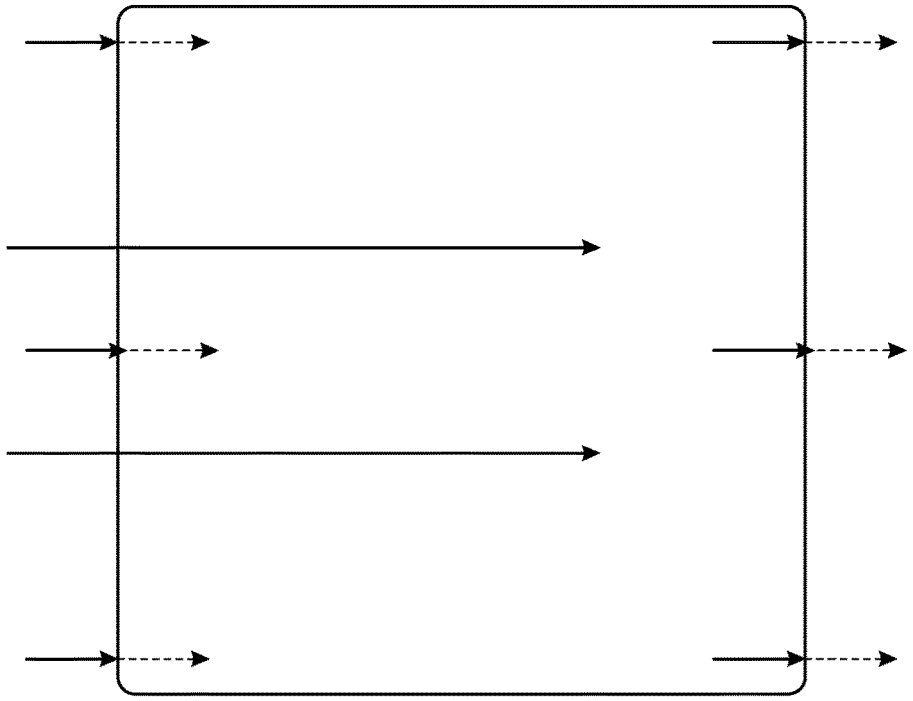
Figure 18:
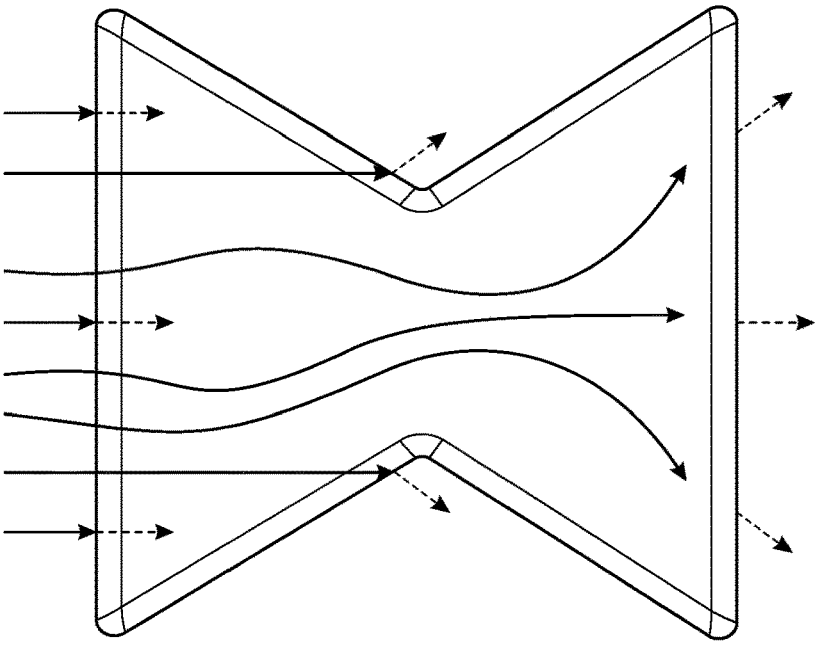
FIG. 18 is a side view of the front filter shown in FIG. 16 with the filter shown in FIG. 2.
Figure 19:
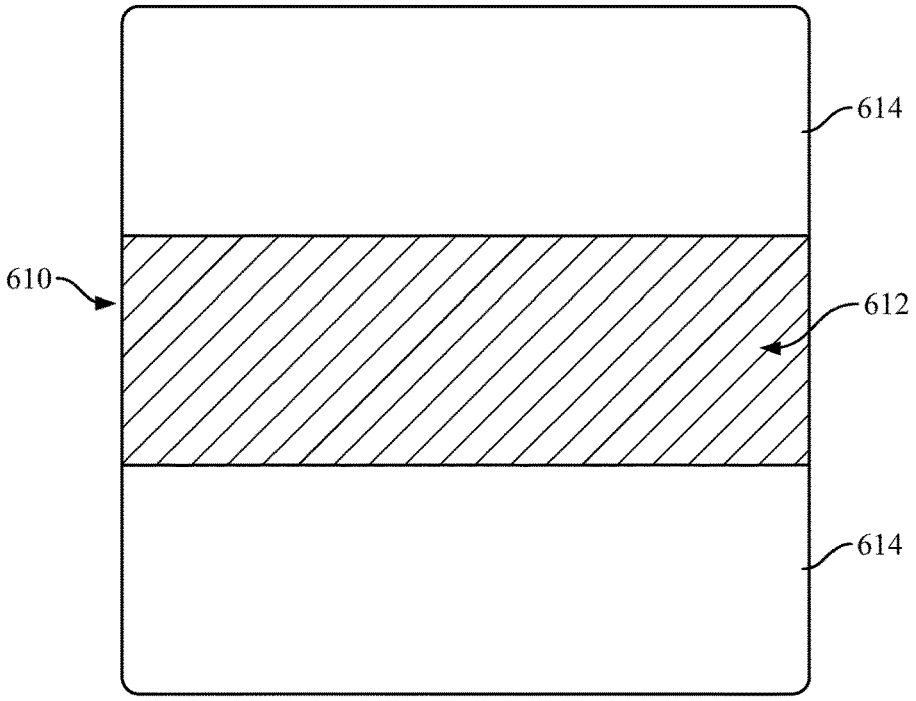
FIGS. 19 and 20 are perspective views of an alternative front filter used with the filter shown in FIG. 12.
Figure 20:
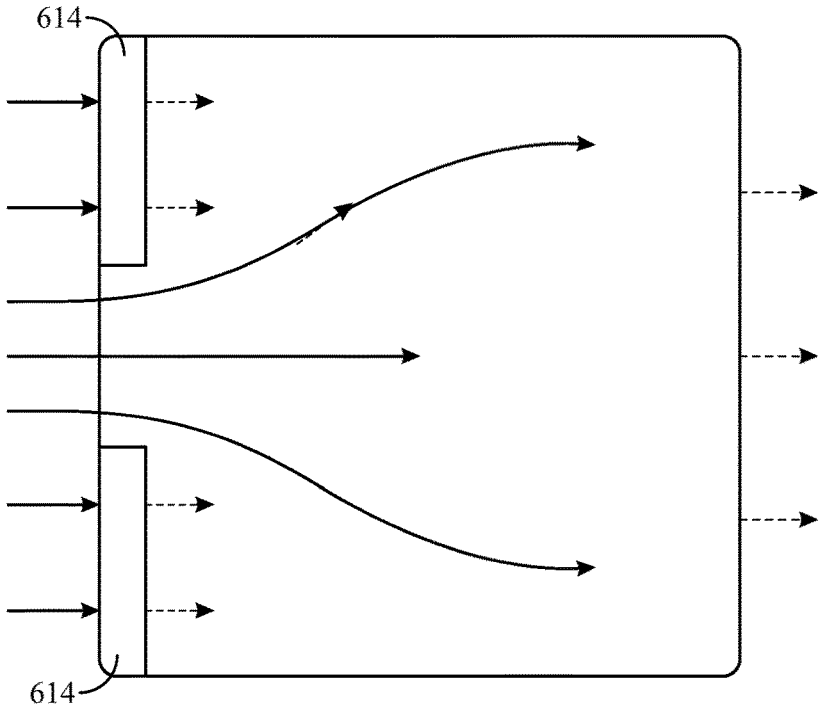
Figure 21:
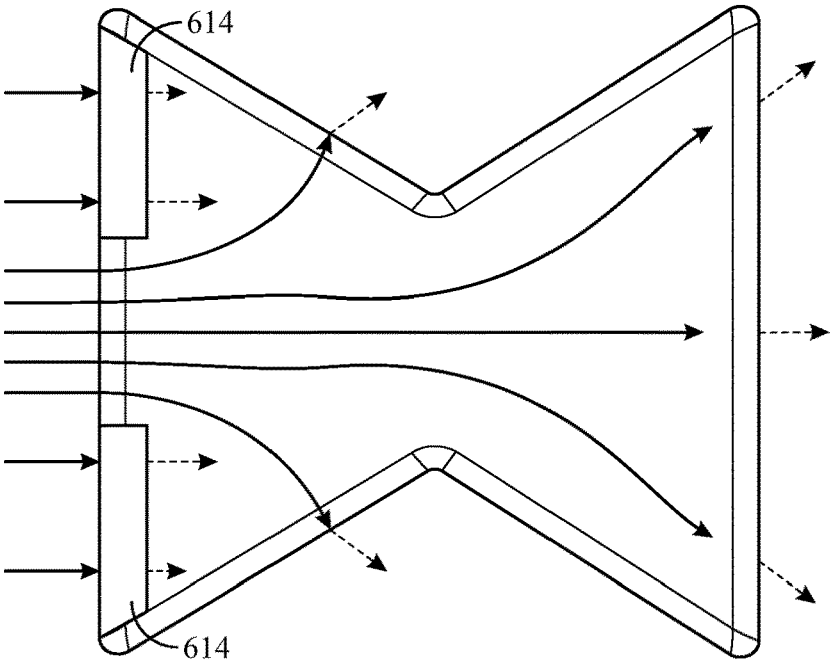
FIG. 21 is a side view of the front filter shown in FIG. 19 with the filter shown in FIG. 2.

FIGS. 16, 17, and 18 illustrate a filter utilizing a cross front filter 600 having four apertures 602. In some embodiments, cross front filter 600 is fabricated to create apertures 602 that differ in size and/or shape from the other apertures 602. FIGS. 19, 20, and 21 illustrate a filter utilizing a double wall front filter 610 having a center aperture 612. In the exemplary embodiment, double wall front filter 610 includes a top flap 614 extending from the top of the filter and a bottom flap 616 extending up from the bottom of the filter. In some embodiments, double wall filter 610 is fabricated from multiple pieces, such that flaps 614 and 616 are not integrally formed together. Alternatively, front filter 610 can be formed as a single unit.

Figure 22:
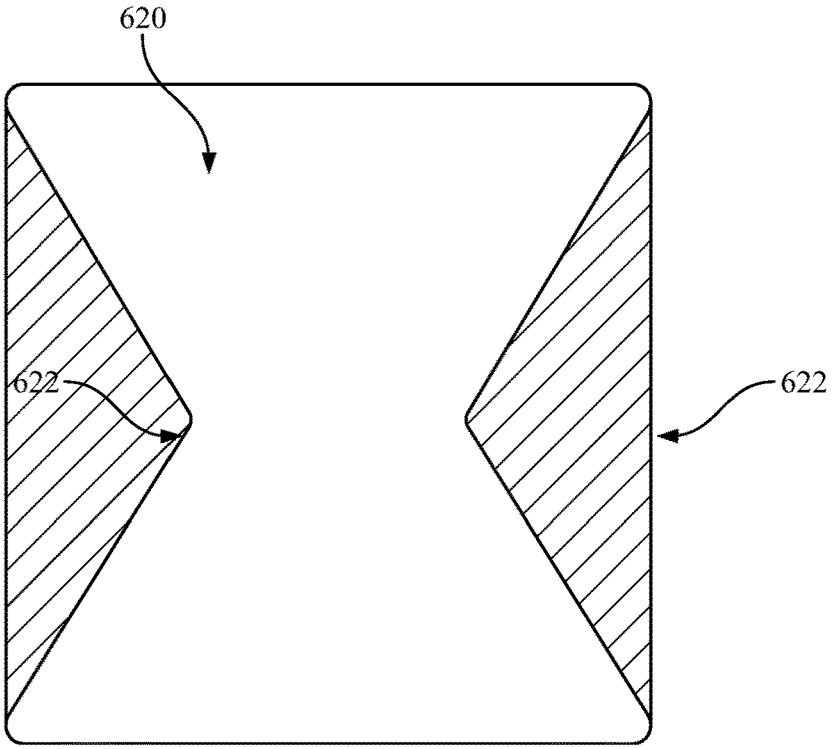
FIGS. 22 and 23 are perspective views of an alternative front filter used with the filter shown in FIG. 12.
Figure 23:
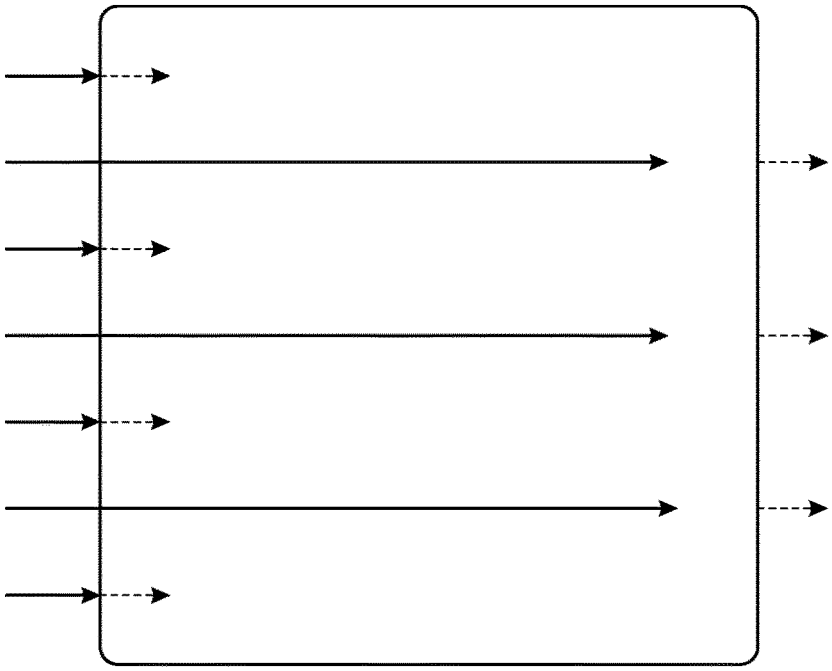
Figure 24:
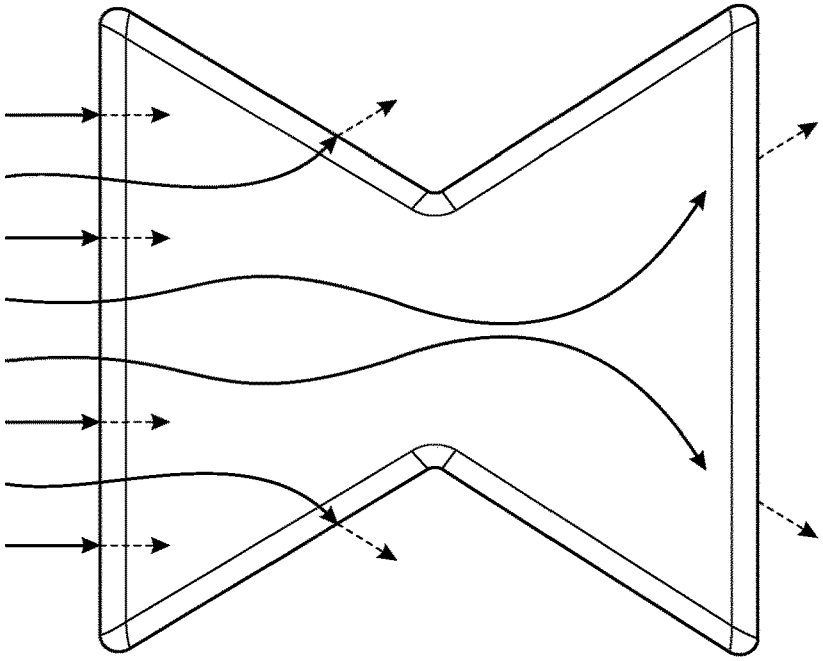
FIG. 24 is a side view of the front filter shown in FIG. 22 with the filter shown in FIG. 2.
Figure 25:
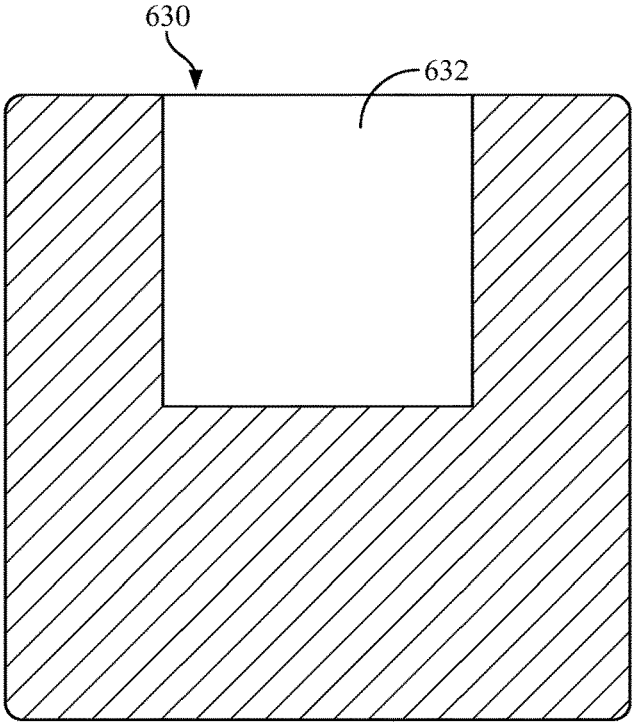
FIGS. 25 and 26 are perspective views of an alternative front filter used with the filter shown in FIG. 12.
Figure 26:
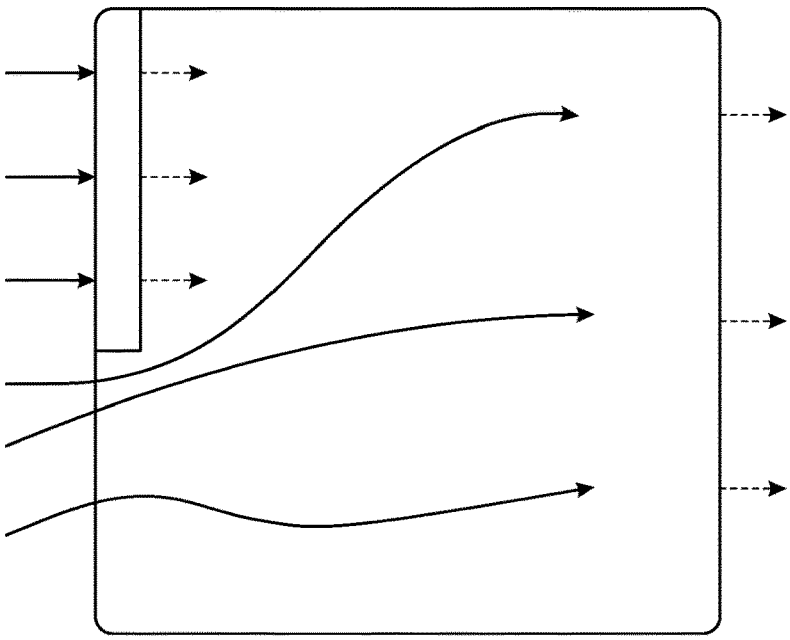
Figure 27:
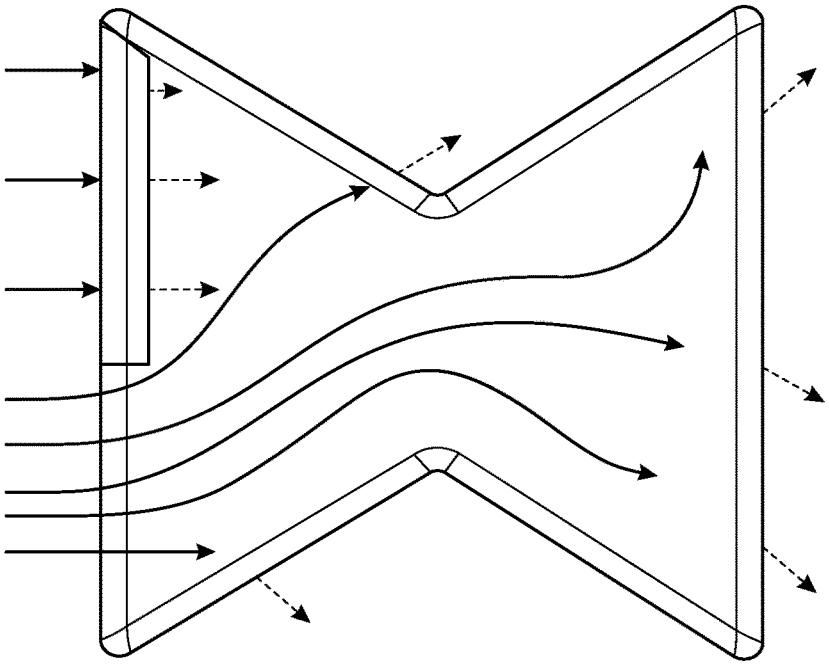
FIG. 27 is a side view of the front filter shown in FIG. 25 with the filter shown in FIG. 2.

FIGS. 22, 23, and 24 illustrate a filter utilizing an hourglass front filter 620 forming two opposing triangular apertures 622. FIGS. 25, 26, and 27 illustrate a filter utilizing an overhang front filter 630 having a flap 632. Flap 632 extends from a top of the filter to act as a collection point for particulate forcing a redirection of flow around flap 632 when substantial accumulation occurs on flap 632. As noted above, flap 632 can be positioned to be extending from any wall of the filter.

Figure 28:
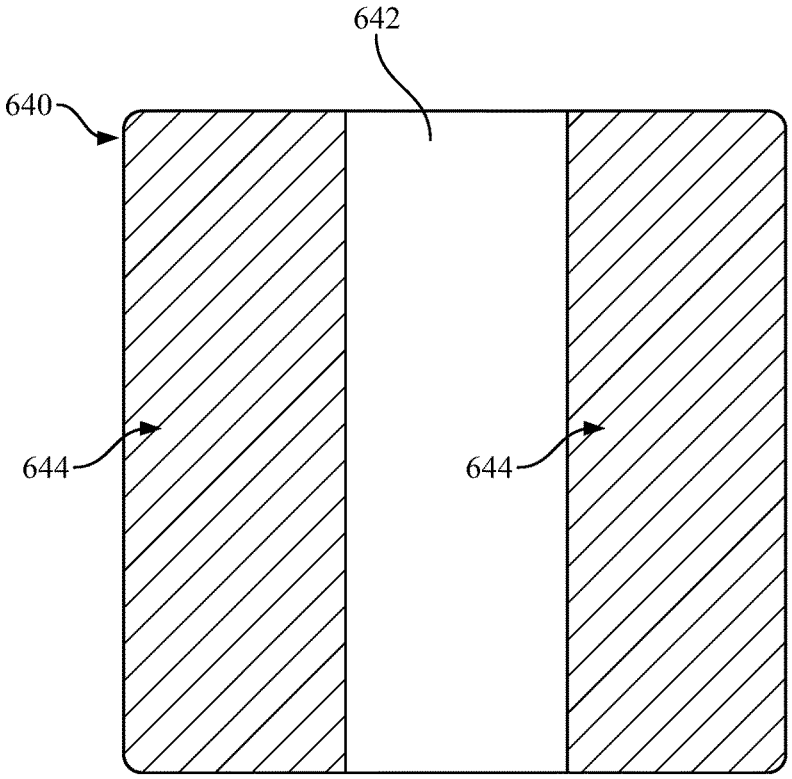
FIGS. 28 and 29 are perspective views of an alternative front filter used with the filter shown in FIG. 12.
Figure 29:
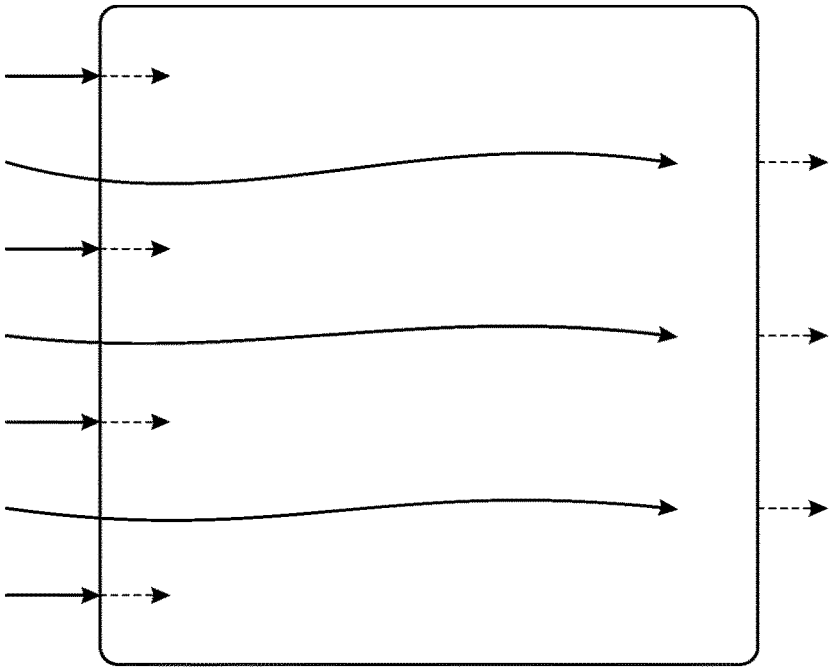
Figure 30:
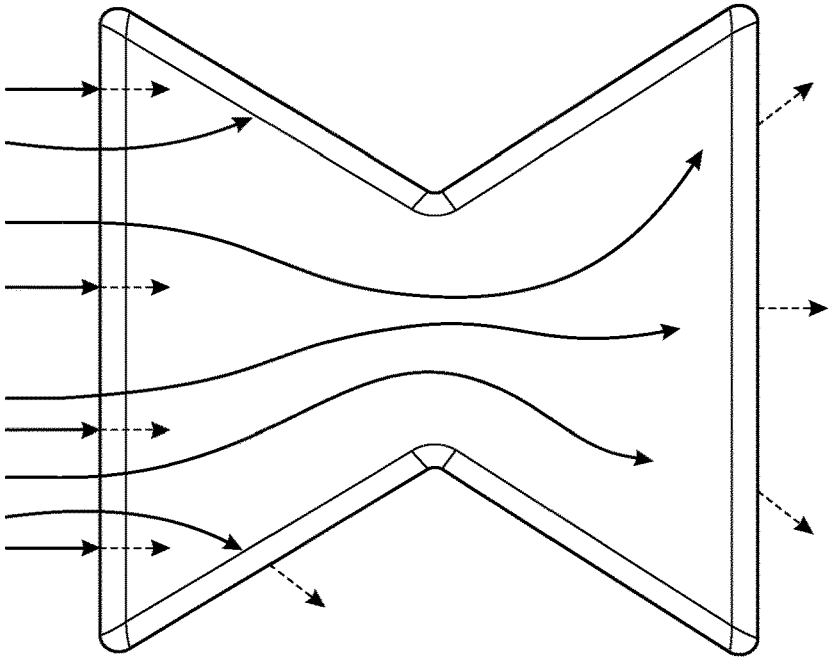
FIG. 30 is a side view of the front filter shown in FIG. 28 with the filter shown in FIG. 2.
Figure 31:
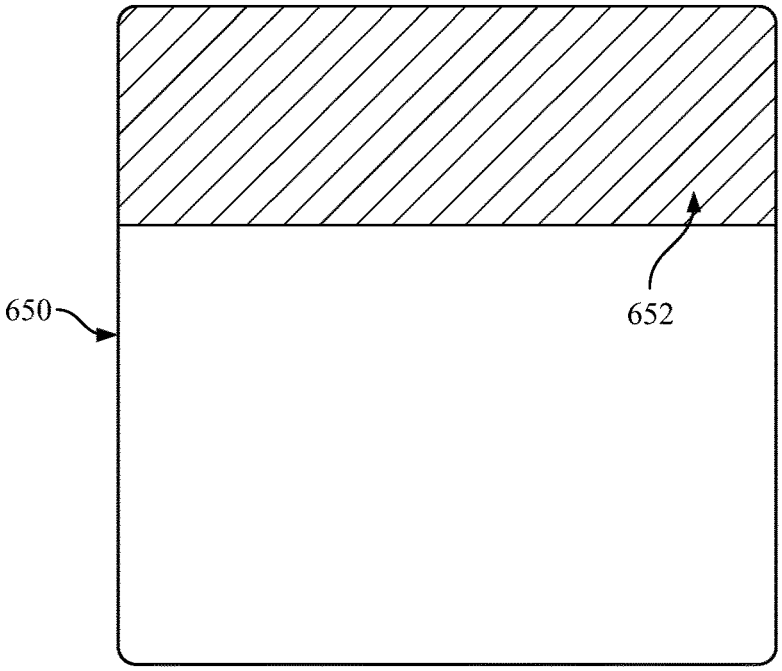
FIGS. 31 and 32 are perspective views of an alternative front filter used with the filter shown in FIG. 12.
Figure 32:
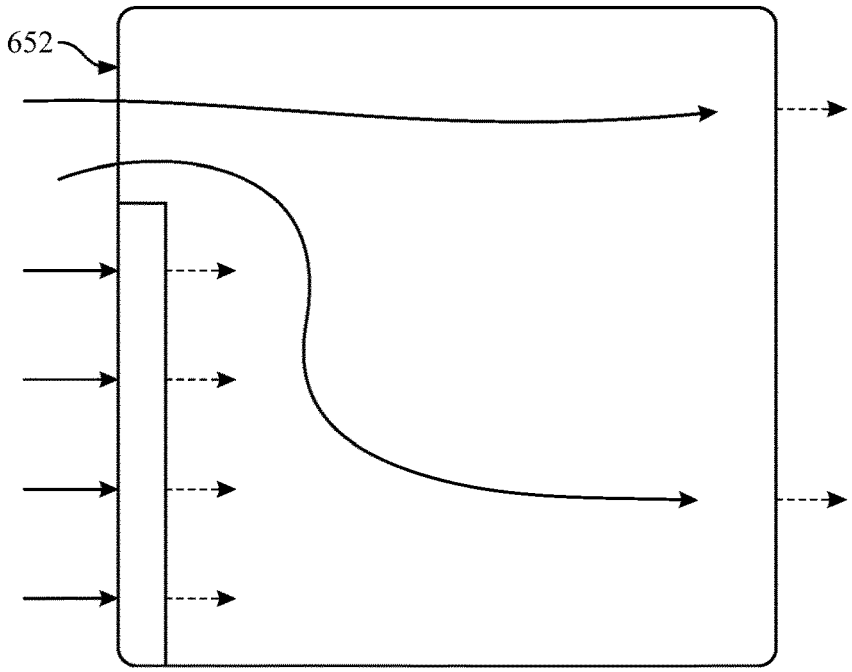
Figure 33:
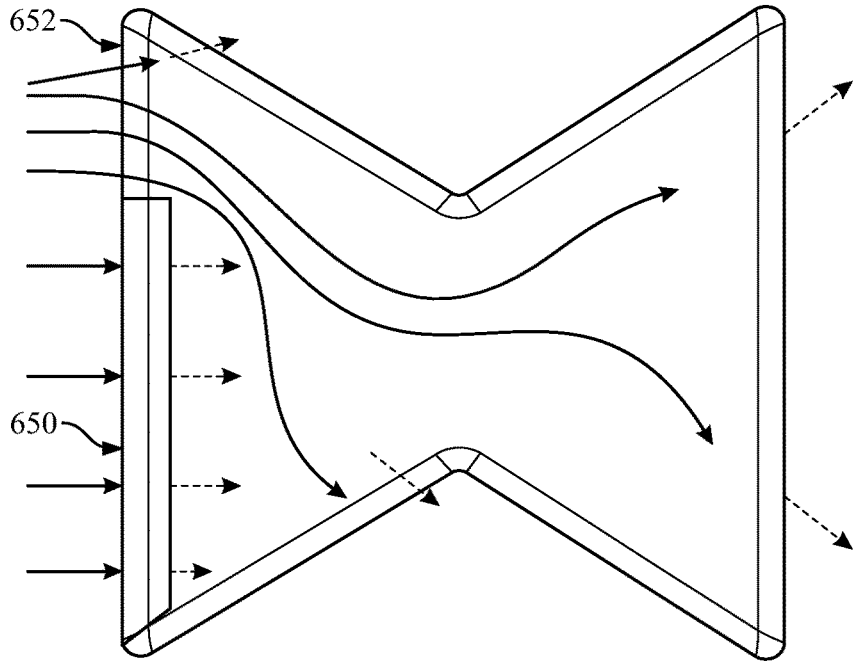
FIG. 33 is a side view of the front filter shown in FIG. 31 with the filter shown in FIG. 2.
Figure 34:
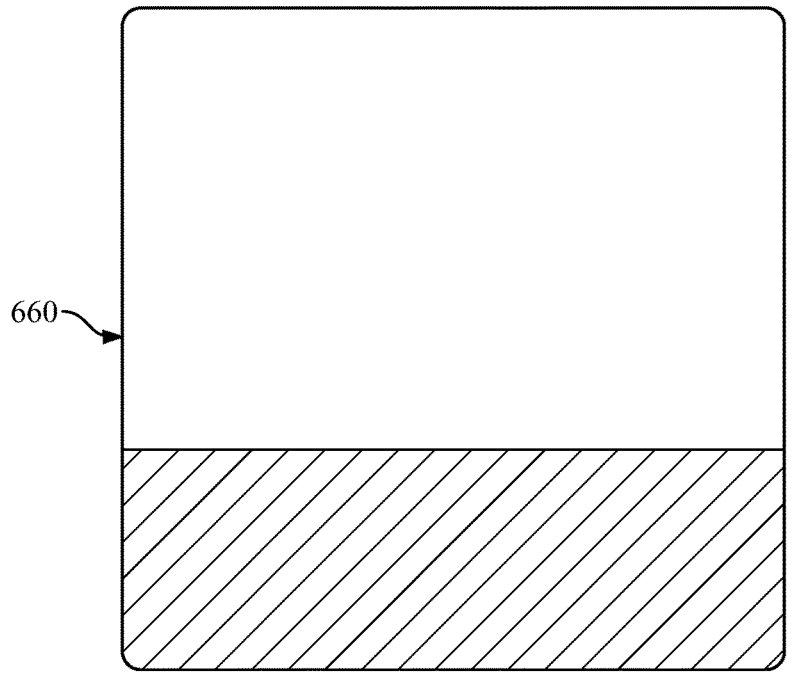
FIGS. 34 and 35 are perspective views of an alternative front filter used with the filter shown in FIG. 12.
Figure 35:
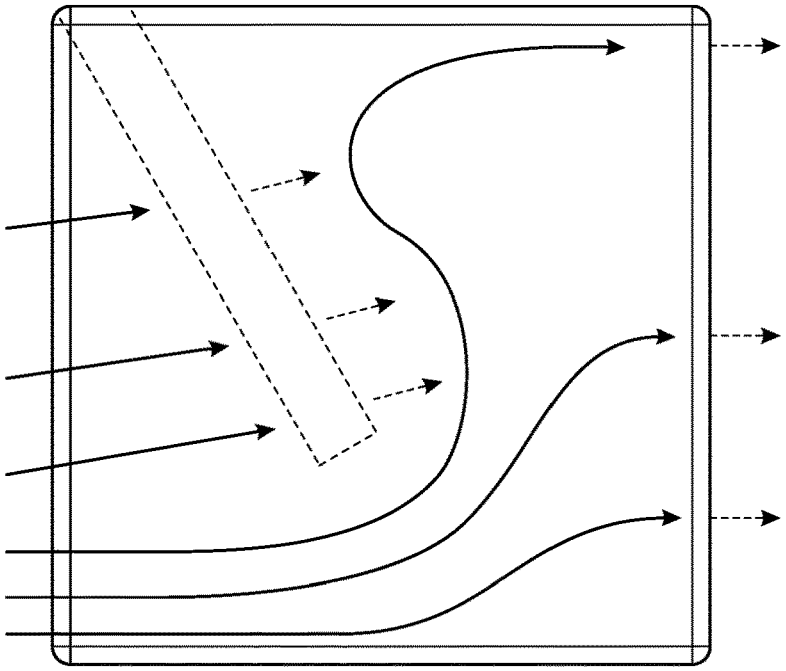
Figure 36:
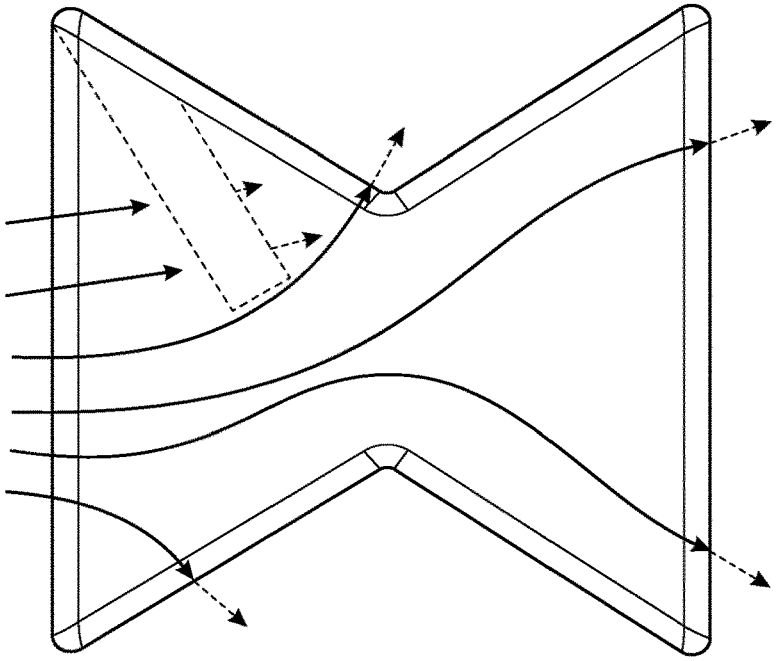
FIG. 36 is a side view of the front filter shown in FIG. 34 with the filter shown in FIG. 2.
Figure 37:
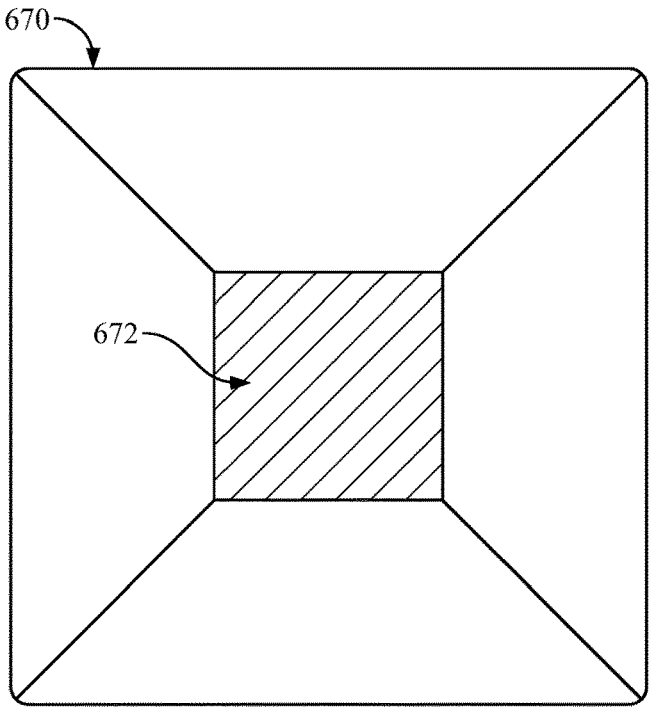
FIGS. 37 and 38 are perspective views of an alternative front filter used with the filter shown in FIG. 12.
Figure 38:
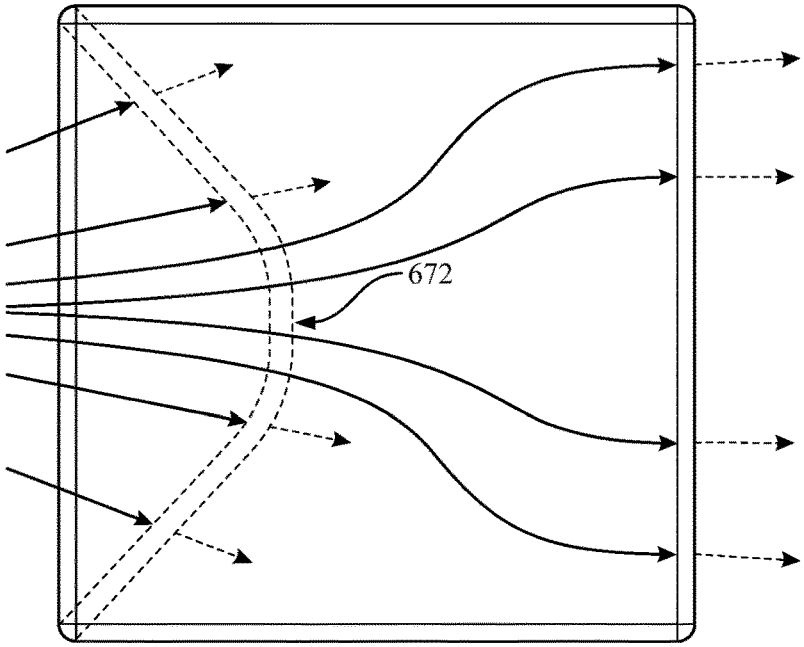
Figure 39:
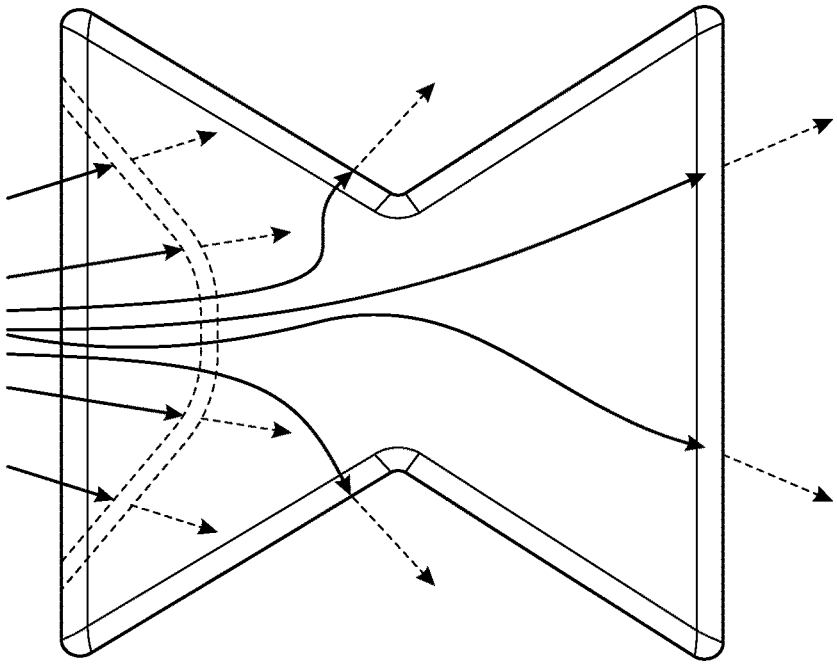
FIG. 39 is a side view of the front filter shown in FIG. 37 with the filter shown in FIG. 2.

FIGS. 28, 29, and 30 illustrate a filter utilizing a strip front filter 640 having a divider 642 forming two apertures 644. While divider 642 is shown oriented vertically, divider 642 can be oriented in any manner that facilitates filtration including, but not limited to, horizontally and diagonally. FIGS. 31, 32, and 33 illustrate a filter utilizing a wall front filter 650 with a single aperture 652 formed by a wall extending from at least one edge of the filter. FIGS. 34, 35, and 36 illustrate a filter utilizing a diagonal front filter 660 that extends from one edge into the filter cavity. FIGS. 37, 38, and 39 illustrate a filter utilizing an inverted front filter 670 having a center aperture 672 formed by four walls extending from the edges of the filter into the cavity.

It should be noted that the front filters front filters 600, 610, 620, 630, 640, 650, 660, and 670 can be created to partially, if not entirely, block direct flow access into the second aperture of the filter forcing flow D around front filters and against side walls before entering into the second aperture.

Figure 40:
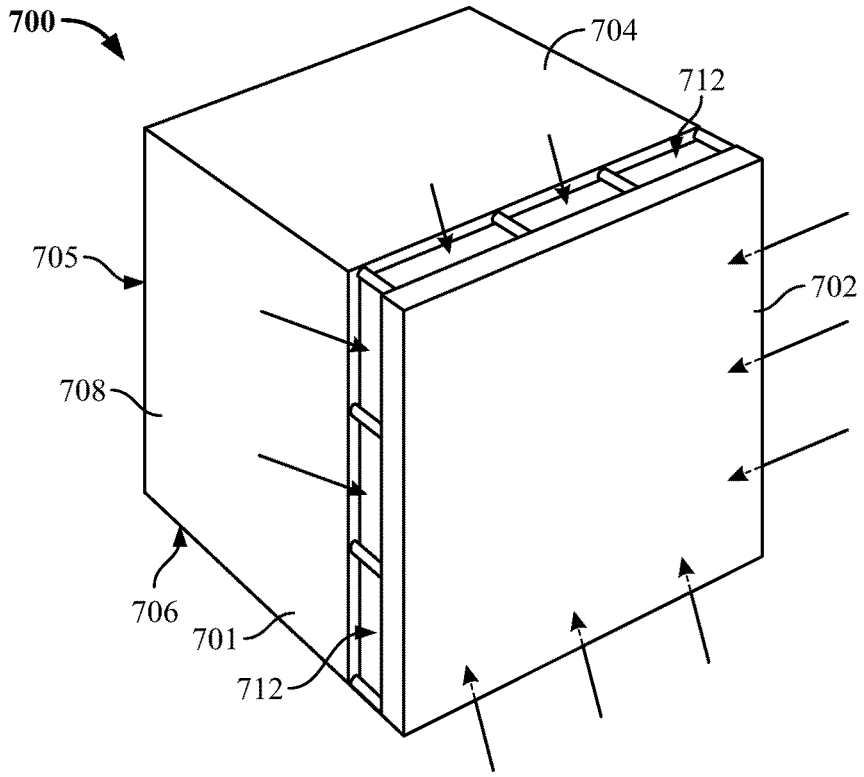
FIG. 40 is a front perspective view of an alternative filter for use with the ventilation system shown in FIG. 1.

FIG. 40 is a front perspective view of an alternative filter 700 for use with the ventilation system shown in FIG. 1. In the exemplary embodiment, filter 700 is formed from filter media 701 and includes a front wall 702, top wall 704, back wall 705, bottom wall 706, first side wall 708, and second side wall 710. Side vents 712 are formed between front wall 702 and walls 704, 706, 708, and 710. In some embodiments, front wall is supported by frame 714. Alternatively, veins or rods can be inserted between wall 702 and walls 704, 706, 708, and 710 to provide support.

Figure 41:
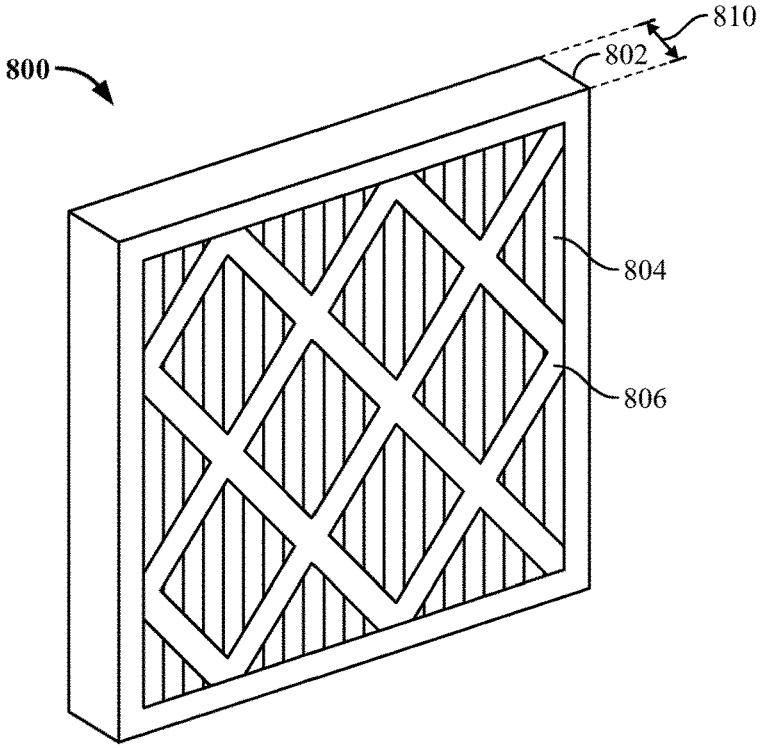
FIG. 41 is a perspective view of a flat panel filter for use with the ventilation system shown in FIG. 1.

FIG. 41 is a perspective view of a flat panel filter 800. In the exemplary embodiment, filter 800 is configured to be utilized within a residential and/or commercial HVAC system, such as that shown in FIG. 41A. Alternatively, filter 800 can also be utilized as a filter in filtration system 100 shown in FIG. 1. Similarly, it should be noted that the filters described above can also be utilized within residential and/or commercial HVAC systems. In the exemplary embodiment, filter 800 includes a wrap or housing 802 that substantially encases filter media 804. Housing 802 is capable of providing support and structure to filter media 804 such that filter 800 can be easily positioned in a flow pattern (e.g., HVAC system).

Figure 41A:
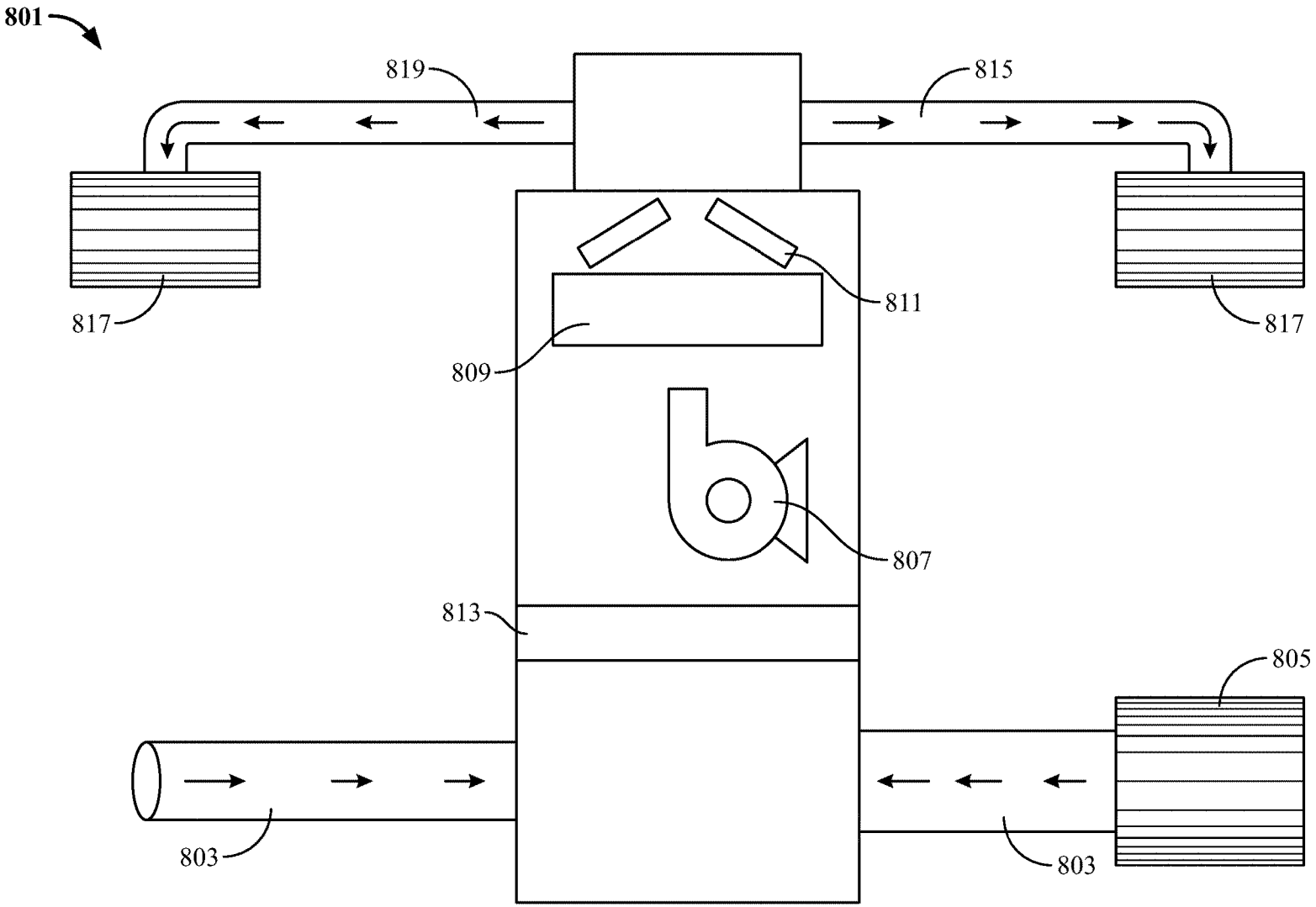
FIG. 41A is a schematic illustration of an exemplary HVAC system utilizing the filter shown in FIG. 41.

FIG. 41A is a schematic illustration of an exemplary HVAC system 801 capable of utilizing filter 800 shown in FIG. 41. System 801 includes one or more return air ducts 803 that draw in flow from a return 805 (e.g., grill) by a fan 807. The flow then passes through a filter, such as filter 800, disposed within a filter receptacle 813 sized to receive filters of a desired dimension. The filter traps, collects, and/or retains unwanted particulate from the flow allowing clean flow which causes the flow to pass over or through heating elements 809 and/or cooling coils 811 to change the temperature of the flow. Then the flow exits out of a supply air duct 815, exit 817 (e.g., grill), and/or an exhaust air duct 819.

Referring back to FIG. 41, in some embodiments, filter 800 includes a front and/or rear panel 806 that further provides support to filter 800 and/or filter media 804. In one embodiment, the font and/or rear panel 806 is fabricated from a material similar to that of housing 802. In the exemplar embodiment, the housing 802 and panel 806 is fabricated from paper and/or cardboard, however housing 802 and panel 806 can be fabricated from any filter frame material described above.

As noted above, filter 800 is designed to fit into any HVAC system and as such, filter 800 can have any size that facilitates filtration described herein including, but not limited to, 10"×20" (25.4 cm×50.8 cm), 12"×12" (30.5 cm×30.5 cm), 12"×20" (30.5 cm×50.8 cm), 12"×24" (30.5 cm×61.0 cm), 14"×14" (35.6 cm×35.6 cm), 14"×20" (35.6 cm×50.8 cm), 14"×24" (35.6 cm×61.0 cm), 14"×25" (35.6 cm×63.5 cm), 15"×20" (38.1 cm×50.8 cm), 16"×20" (40.6 cm×50.8 cm), 16"×25" (40.6 cm×63.5 cm), 18"×20" (45.7 cm×50.8 cm), 18"×24" (45.72 cm×61.0 cm), 20"×20" (50.8 cm×50.8 cm), 20"×25" (50.8 cm×63.5 cm), 20"×30" (50.8 cm×76.2 cm), and 24"×24" (61.0 cm×61.0 cm). Similarly, filter 800 has a depth (thickness) 810 that corresponds to the system being used. The depth 810 of filter 800 can be any depth including, but not limited to 1" (2.54 cm), 2" (5.08 cm), 3" (7.62 cm), 4" (10.16 cm), 5" (12.7 cm), 10" (25.4 cm), 20" (50.8 cm), 30" (76.2 cm), and 40" (101.6 cm).

Figure 42:
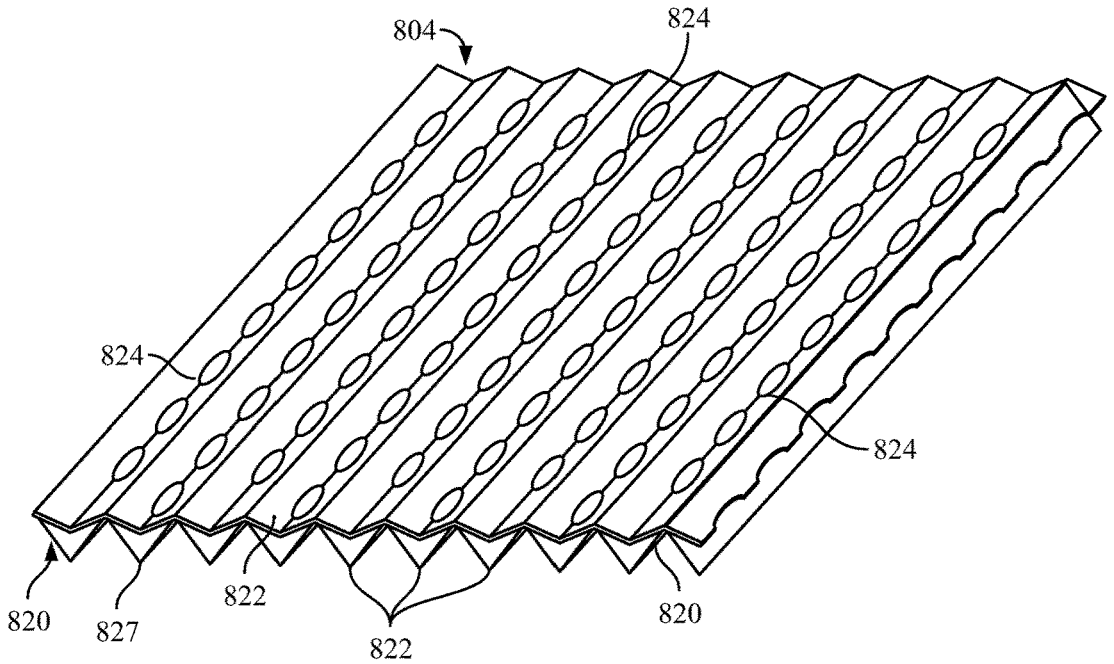
FIG. 42 is a perspective view of the media that can be utilized with the filter shown in FIG. 41.
Figure 43:
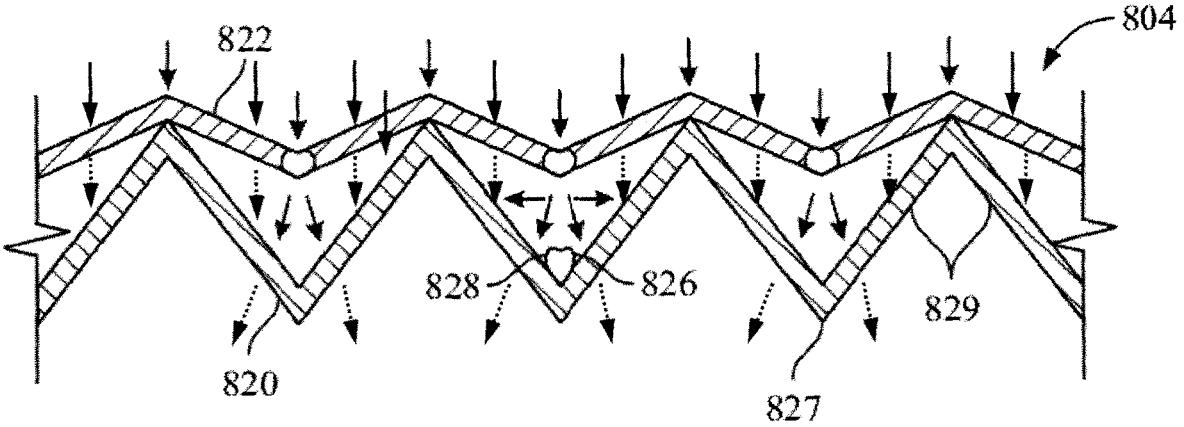
FIG. 43 is a side view of the media shown in FIG. 42.

In the exemplary embodiment, filter 800 includes a pleated filter media 804. FIGS. 42 and 43 are illustrations of an exemplary filter media 804 for use with filter 800 shown in FIG. 41 and/or filters 200, 300, 400, and 500 shown in FIGS. 2-15. Filter media 804 includes a first filter layer 820 and a second filter layer 822. First and second filter layers 820 and 822 are fabricated from a filter media described above in the form of pleats. In one embodiment, the layers 820 and 822 are fabricated from polypropylene and polyolefin plastic. The second filter layer 822 is positioned over first layer 820 to provide a pre-filter for first layer 820. In some embodiments, first and second layers 820 and 822 are coupled together by gluing. Alternatively, layers 820 and 822 can be coupled together in any manner that enables layers 820 and 822 to function together as a single filter including, but not limited to, stitching, heat staking, laminating, and ultrasonically welding. It should be noted that first layer 820 can be selected from a material that provides support and maintains uniformity of pleats of second layer 822 as filter 800 undergoes and/or is subjected to compression.

With each of layers 820 and 822 fabricated as pleats, two layers of filtration can be positioned within one filter in a space saving manner. For example, a filter having a 1" (2.54 cm) depth can facilitate first layer 820 being 1" (2.54 cm) in depth with second layer 822 having ½" (1.27 cm) depth being positioned over first layer 820. Likewise, a 2" (5.08 cm) depth filter can facilitate a 2" (5.08 cm) first layer 820 with a 1" (2.54 cm) second layer 822, a 4" (10.16 cm) depth filter can facilitate a 4" (10.16 cm) first layer 820 with a 2" (5.08 cm) second layer, and a 5" (12.7 cm) depth filter can facilitate a 5" (12.7 cm) first layer 820 with a 2.5" (6.35 cm) second layer. It should be noted however, that the depths of layers 820 and 822 can be anything that facilitates filtration and accomplishes the desired application. In one embodiment, second layer 822 is fabricated as a substantially flat portion of media such that it is not fabricated with pleats. In an alternative embodiment, first layer 820 is fabricated as a flat portion of media while second layer 822 is fabricated with pleats. Even though media 804 is discussed as being fabricated as being pleated, it should be noted that media 804 can have any shape and/or pattern including, but not limited to a wave or waveform pattern (sine, square, triangle, rectangle, and saw tooth).

In the exemplary embodiment, second layer 822 has a plurality of apertures 824. While apertures 824 are illustrated as being oval in shaped, it should be noted that apertures 824 can be created in any shape and have any size that facilitates filtration as described herein. Additionally, the spacing between apertures 824 can vary to accommodate the desired application. In operation, particulate laden flow D is moved across or over second layer 822. Layer 822 filters flow D by collecting and/or attracting particulate on the surface of second layer 822. As shown by FIG. 43, the apertures 824 allow a portion of flow D to be redirected to first layer 820 as the surface of second layer 822 becomes clogged. Similarly, as the bottom portion 827 of first layer 820 becomes clogged or laden with particulate 826, a vortex begins to be created and flow is redirected 828 into sidewalls of first layer 820 such that particulate begins to accumulate through the sidewalls 829 of first layer 820.

The two medias 820 and 822 will then be coupled together by gluing the peak of 820 to the peak of 822. This will not only prevent bypass of unwanted particulate between the valleys but will provide stability to the filter. Media 822 will create a blocking or umbrella effect over media 820 to aid in inhibiting front loading of media 820 between apertures 805 which will increase the life of the filter.

In one embodiment, filter 800 is incased in a two piece die cut high wet strength beverage board 806. The ends of all four edges of media 820 and 822 are coupled (e.g., glued) to the inside edges of 806. The media 804, 820, and 822 used is a nonwoven synthetic media blend hypoallergenic with an electrostatic charge and an antimicrobial treatment. In such an embodiment, media 820 has a MERV rating in the range of 8-17 and media 822 has a MERV rating in the range of 2-15. However, it should be noted that the media of filter 800 can have any of the properties of media descried above.

In one embodiment, filter 800 will is a 20"×25"×5" (50.8 cm×63.5 cm×12.7 cm) filter with media 820 having a depth from peak to valley of 5" (12.7 cm) and media 822 having a depth from peak to valley of 2½" (6.35 cm). In such and embodiment, 8 pleats per linear foot extending 25" in (63.5 cm) length provides 16 pleats in filter 800. Alternatively, any number of pleats can be used. In one embodiment, apertures 824 have a diameter of ¾" (1.91 cm) and are spaced apart in each valley by 4" (10.16 cm). In such and embodiment, apertures 824 alternate positions in the valley such that aperture 824 are spaced apart 4" (10.16 cm) in the latitudinal and longitudinal directions. Such a pattern provides filter 800 with an even airflow and properly blanket media 820 partially covering 820 from direct flow which creates a void between the first 820 and second layers 822. Accordingly, in such an embodiment, a total of approximately 72 apertures would exists in filter 800 dimensioned as described above.

Figure 44:
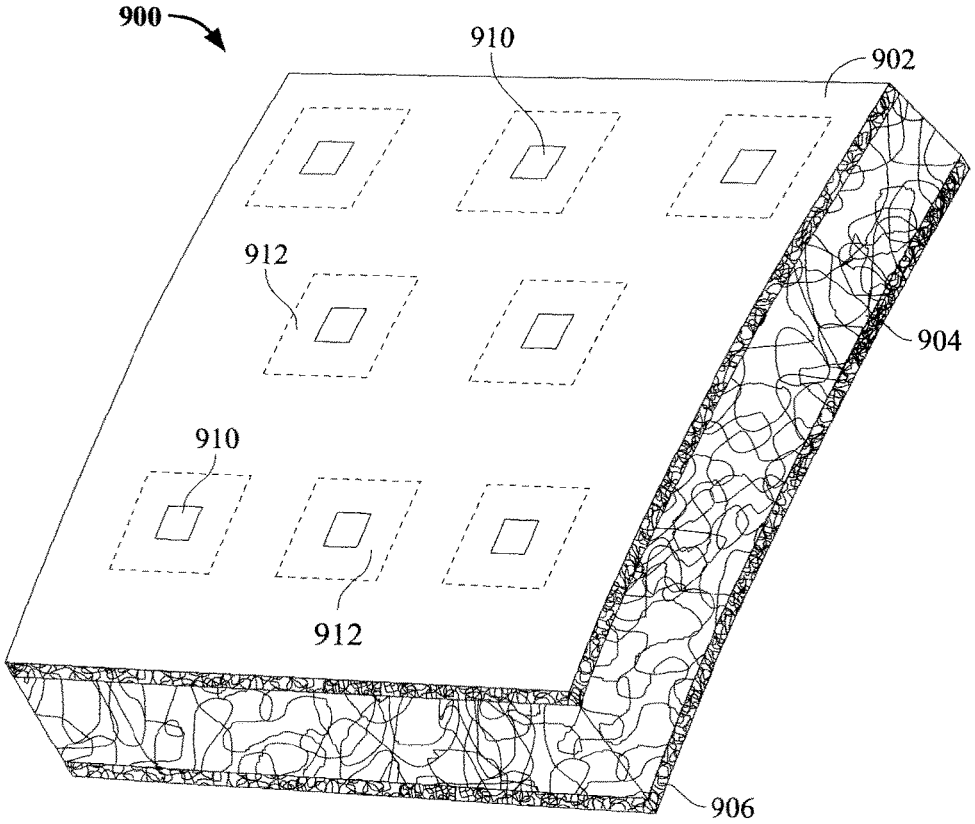
FIG. 44 is a perspective view of filter media that can be utilized with the filter shown in FIG. 41.
Figure 45:
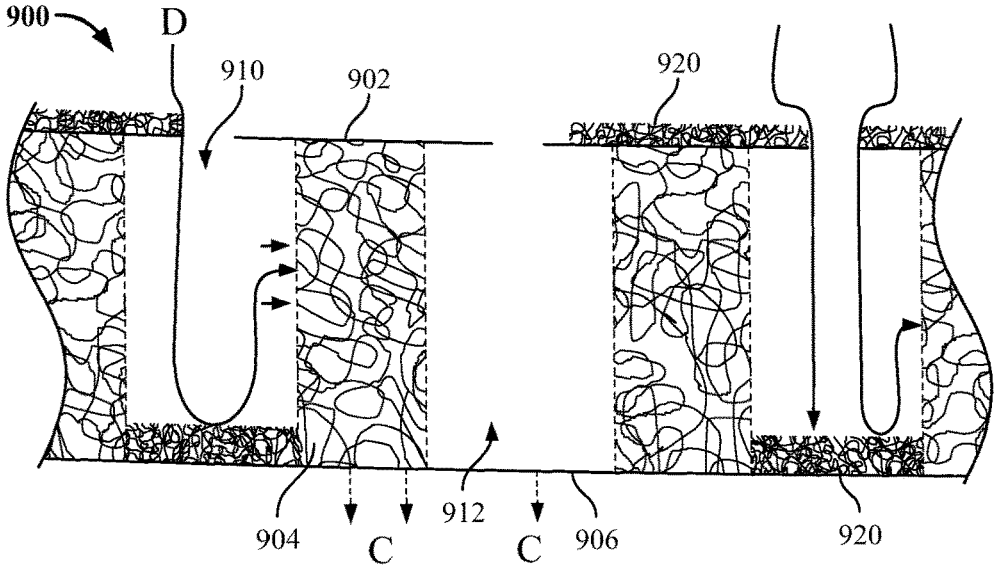
FIG. 45 is a side cut-away view of the filter media shown in FIG. 44.
Figure 46:
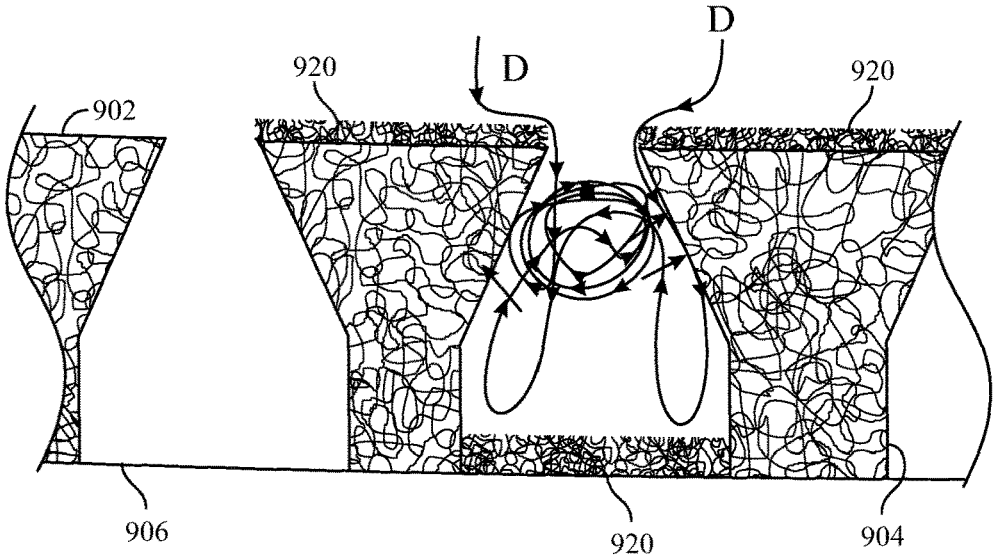
FIGS. 46-50 are side cut-away views of alternative embodiments of the filter media shown in FIG. 45.

Similar to the effects created by filter 800, FIGS. 44-46 illustrate alternative filter media constructions that can be utilized with filter 800 and/or filters 200, 300, 400, and 500 shown in FIGS. 2-15. FIG. 44 is a perspective view of filter media 900 that can be utilized with filter 800 shown in FIG. 41 and FIG. 45 is a side cut-away view of the filter media 900 shown in FIG. 44. In the exemplary embodiment, the filter media utilized in FIGS. 44, 45, and 46 is a multi-denier, multistage polyester media. Alternatively, the media can be fabricated with any of the materials described above. In the exemplary embodiment, the filter media shown in FIGS. 44, 45, and 46 can be fabricated as a pad or blanket. Although the pads can have any size needed for desired applications, the pads can be fabricated in sizes including, but not limited to, 20"×20" (50.8 cm×50.8 cm), 20"×25" (50.8 cm×63.5 cm), 24"×24" (60.96 cm×60.96 cm), 16"×20" (40.64 cm×50.8 cm), 16×25" (40.64 cm×63.5 cm), and 25"×25" (63.5 cm×63.5 cm). Similarly to pads, blankets can have any size needed for desired applications. In some embodiments, the blankets are fabricated as a roll or sheet and can have any size necessary including, but not limited to, 24"×6' (60.96 cm×1.83 m), 24"×12' (60.96 cm×3.66 m), 24"×24' (60.96 cm×7.32 m), 24"×48' (60.96 cm×14.63 m), 36"×6' (91.44 cm×1.83 m), 36"×12' (91.44 cm×3.66 m), 36"×24' (91.44 cm×7.32 m), 36"×48' (91.44 cm×14.63 m), 48"×6' (1.22 m×1.83 m), 48"×12' (1.22 m×3.66 m), 48"×24' (1.22 m×7.32 m), 48"×48' (1.22 m×14.63 m), 60"×6' (1.52 m×1.83 m), 60"×12' (1.52 m×3.66 m), 60"×24' (1.52 m×7.32 m), and 60"×48' (1.52 m×14.63 m).

In the exemplary embodiment, media 900 includes a top filter media layer 902, a middle filter layer 904, and a backer or base layer 906. In the exemplary embodiment, middle layer 904 is fabricated with a substantially open web or matrix of fibers that is less dense (e.g., more open) that the matrix of first layer 902 and/or backer 906. Alternatively, layers 902, 904, and 906 are fabricated having the same material and having the same density. Although the depth/height of media 900 can be anything desired for particular applications, in one embodiment, the total depth/height is two inches (5.08 cm). In such an embodiment, top layer will 902 will have a depth/height of 0.15" (2.81 mm), middle layer 904 has a depth/height of 1.25" (3.175 cm), and bottom layer or backer 906 has a depth/height of 0.65" (1.651 cm).

Top layer 902 is configured with a plurality of first apertures 910 created within layer 902 and middle layer 904 is configured with a plurality of second apertures or voids 912 created within middle layer 904. In the exemplary embodiment, apertures 910 are created as squares being 1" (2.54 cm) in diameter and apertures 912 are created as squares being 2" (5.08 cm) in diameter. However, apertures 610 and 612 can be fabricated to be any shape including, but not limited to, circle, diamond, rectangle, pentagon hexagon triangle, and pyramid and have any diameter that facilitates filtration as described herein. In some embodiments, apertures 610 and 612 are created in a reoccurring alternating pattern, however the pattern of apertures 610 and 612 can be any pattern including, but not limited to being, symmetrical, random, and semi-random. In one embodiment, apertures 610 and 612 are spaced apart from the center point of each aperture 610 by 3" (7.62 cm) however, the spacing can be anything required for particular applications.

The first apertures 910 have a maximum diameter, cross-sectional dimension, or width 911 and voids 912 have a maximum diameter or width 913. Top layer 902 is positioned over middle layer 904 such that first apertures 910 are positioned over second apertures 912. In one embodiment, apertures 910 and 912 are created in a square or rectangular shape, however, apertures 910 and 912 can be formed in any shape that facilitates filtration as described herein including, but not limited to, a circle, oval, hexagon, diamond, triangle, and polygon. While the filter media 900 shown in FIGS. 44-46 is illustrated utilizing the same shapes as the first and second apertures 910 and 912, it should be noted that the first aperture 910 can have a shape (e.g., circle or oval) that is different from the second aperture or void 912 (e.g., square or rectangle).

In operation, particulate laden flow D moves against top layer 902 and particulate 920 begins to accumulate on the surface of layer 902. As particulate accumulates, suction force placed on media 900 forces or redirects flow D to enter through first aperture 910 downward to backer 906 where flow D is filtered and particulate 920 begins to accumulate. As particulate 920 accumulates on backer 906, flow D is redirected into sidewalls of middle layer 904 and down into backer 906 to exit as clean flow C.

FIG. 46 is a side cut-away view of an alternative embodiment 901 of the filter media 900 shown in FIG. 45. In the alternative embodiment, the sidewalls of middle layer 904 are angled and/or tapered toward backer 906 to create a concave shape within aperture 912. In some embodiments, the sidewalls of layer 904 are angled from layer 902 to layer 906, however it is contemplated that only a portion of the sidewalls of layer 904 would be angled, such as depicted in FIG. 46. In operation, the concave shape of the sidewalls of middle layer 904 create a more turbulent effect (e.g., vortex) on flow D when particulate has accumulated on layers 902 and 906, which in turn can increase the efficacy of media 900 and/or the filter.

FIGS. 47-50 are side cut-away views of alternative embodiments 950, 960, 970, and 980 of the filter media 900 shown in FIG. 45. Similar to media 900 and 901, each of media 950, 960, 970, and 980 includes a first aperture 910 and a void 912 that extends between aperture 910 and base layer 906. In each of embodiments 950, 960, 970, and 980, apertures 910 have a maximum cross-sectional dimension or width 911 and voids 912 have a maximum cross-sectional dimension or width 913 and the maximum width 913 is larger than the maximum width 911. In the exemplary embodiment, the maximum width 911 of apertures 910 is ½" (1.27 cm) and the maximum width 913 of voids 912 is 1½" (3.81 cm). Alternatively, maximum widths 911 and 913 can be any dimension that facilitates filtration as described herein including, but not limited to, 1" (2.54 cm), 1½" (3.81 cm), 2" (5.08 cm), and 3" (7.62 cm).

Figure 47:
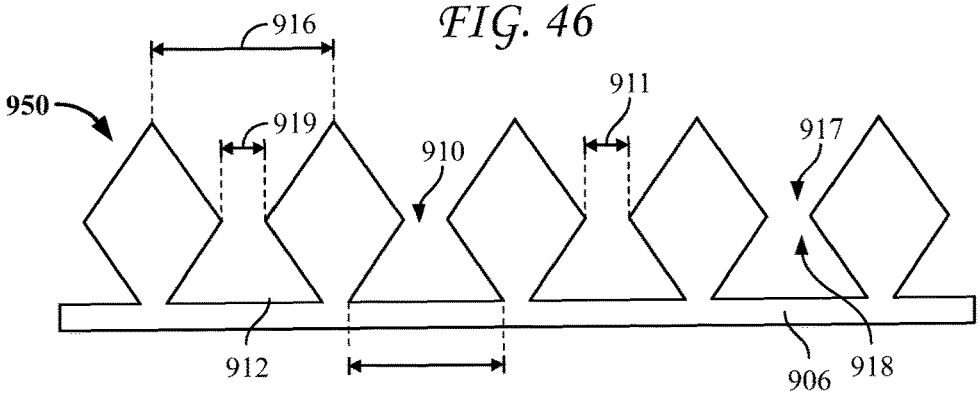
Figure 48:
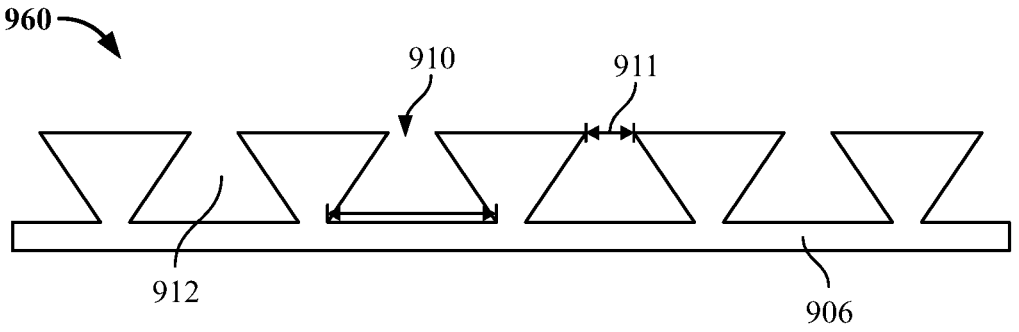
Figure 49:
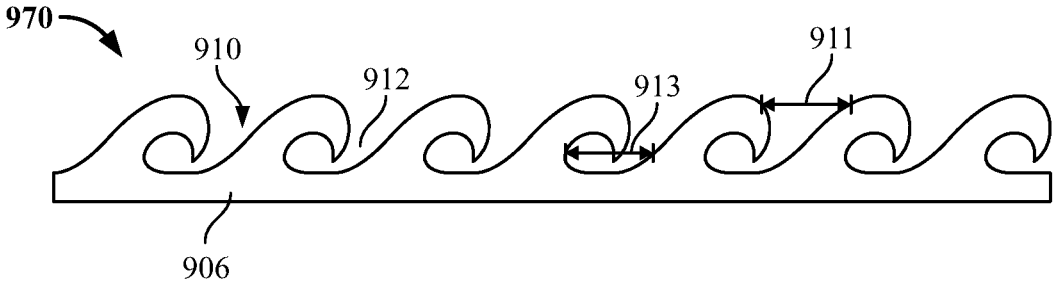
Figure 50:
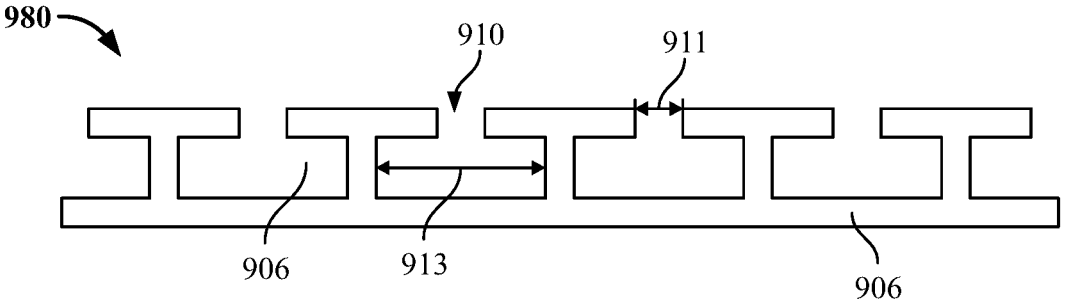

FIG. 47 represents a diamond shaped filter media that substantially mimics the effectiveness of the filters shown in FIGS. 2-14. As such, media 950 is formed by projections 914 extending from layer 906. Projections 914 are fabricated to form a first aperture 916 that forms an inner plenum that extends from aperture 916 to layer 906. The inner plenum has a cross-sectional dimension (e.g., width) with at least one cross-sectional dimension of inner plenum that decreases (e.g., tapers) from aperture 916 to an intermediate location between aperture 916 and layer 906 to define a front plenum section (i.e., upstream plenum section) 917. In the illustrated embodiment, inner surface of each of the side walls defining the front plenum section 917 extends inward at an angle relative to a longitudinal axis. The cross-sectional dimension of inner plenum increases (e.g., flares) from an intermediate location toward (e.g., to) layer 906 to define a rear plenum section (i.e., downstream plenum section) 918. The intermediate location defines a second aperture (or neck) 919 leading to rear (downstream) plenum section and flowably coupling front and rear plenum sections to one another. A cross-sectional area of first aperture 916 is greater than cross-sectional area of second aperture 919. For example, the cross-sectional area of first aperture 916 may be from about 0.5 times to about 20 times greater than cross-sectional area of second aperture 919. Thus, the illustrated inner plenum has a generally hourglass shape (i.e., hourglass shape in longitudinal section). The filter also has an hourglass shape in longitudinal section. The plenum(s) and/or media 950 may have other shapes without necessarily departing from the scope of the present invention.

It should be noted that apertures 910 having a smaller cross-sectional dimension (e.g, width) than voids 912 enables aperture to create an accelerated direct flow into void 912 that will create a turbulent effect of the flow D to facilitate particulate build-up throughout void 912. In some embodiments, the increased velocity of flow D into void 912 will apply pressure to top layer 902 and/or edges of aperture 910 to create a funnel or diaphragm effect. Additionally, the limited width of aperture 910 relative to void 912 substantially restricts flow D from escaping from void 912 without undergoing filtration.

While the media 900, 901, 950, 960, 970, and 980 shown in FIGS. 44-50 is illustrated as three layers, it should be noted that media 900, 901, 950, 960, 970, and 980 can be fabricated as one single layer or of multiple layers including but not limited to 2, 4, 5, and 6. For example layers 902 and 904 can be fabricated as one layer with layer 906 coupled to the layers, or layers 904 and 906 can be fabricated as 1 layer with layer 902 coupled to the layers. Similarly, any of layers, such as layer 904, can be fabricated as multiple layers. Additionally, while layers 902, 904, and 906 are described as having different densities, the layers can be fabricated from the substantially similar or the same material having substantially similar or the same densities.

As described above with reference to FIGS. 44, 45, and 46 the filter media shown in FIGS. 47, 48, 49, and 50 can be fabricated as a pad or blanket. Although the pads can have any size needed for desired applications, the pads can be fabricated in sizes including, but not limited to, 20"×20" (50.8 cm×50.8 cm), 20"×25" (50.8 cm×63.5 cm), 24"×24" (60.96 cm×60.96 cm), 16"×20" (40.64 cm×50.8 cm), 16×25" (40.64 cm×63.5 cm), and 25"×25" (63.5 cm×63.5 cm). Similarly to pads, blankets can have any size needed for desired applications. In some embodiments, the blankets are fabricated as a roll or sheet and can have any size necessary including, but not limited to, 24"×6' (60.96 cm×1.83 m), 24"×12' (60.96 cm×3.66 m), 24"×24' (60.96 cm×7.32 m), 24"×48' (60.96 cm×14.63 m), 36"×6' (91.44 cm×1.83 m), 36"×12' (91.44 cm×3.66 m), 36"×24' (91.44 cm×7.32 m), 36"×48' (91.44 cm×14.63 m), 48"×6' (1.22 m×1.83 m), 48"×12' (1.22 m×3.66 m), 48"×24' (1.22 m×7.32 m), 48"×48' (1.22 m×14.63 m), 60"×6' (1.52 m×1.83 m), 60"×12' (1.52 m×3.66 m), 60"×24' (1.52 m×7.32 m), and 60"×48' (1.52 m×14.63 m).

Figure 51:
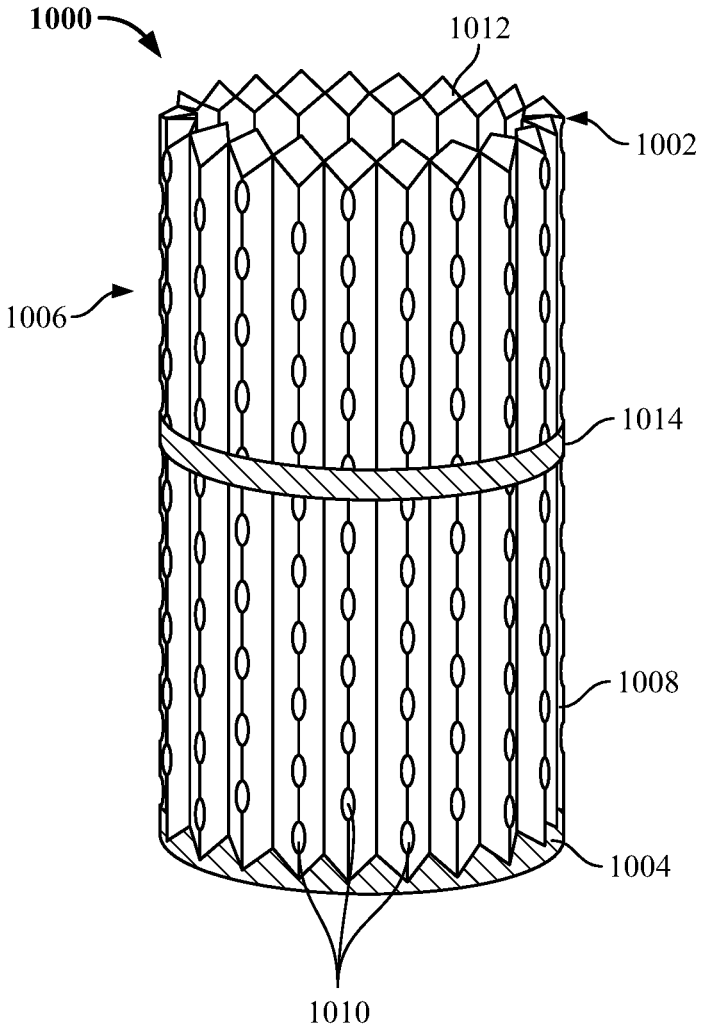
FIG. 51 is a perspective view of a cylindrical filter for use with the filtration system shown in FIG. 1.

FIG. 51 is a perspective view of a cylindrical filter 1000 for use with the filtration system 100 shown in FIG. 1. In the exemplary embodiment, filter 1000 is shown to be utilized as a hanging filter in that a top portion seals against a frame (e.g., tube sheet) of a conduit of a filtration system, such as conduit 114 shown in FIG. 1. Alternatively, filter 1000 can be fabricated to be positioned on a frame such that filter 1000 extends upward from a frame of a conduit of a filtration system. In the exemplary embodiment, filter 1000 has a flow aperture 1002 that is defined by an aperture seal (not shown) circumscribing aperture 1002 and configured to mate with and/or against a ventilation frame. Filter 1000 also includes a cap 1004 that substantially seals filter 1000 in a manner that forces flow through aperture 1002 into a ventilation system.

Figure 52:
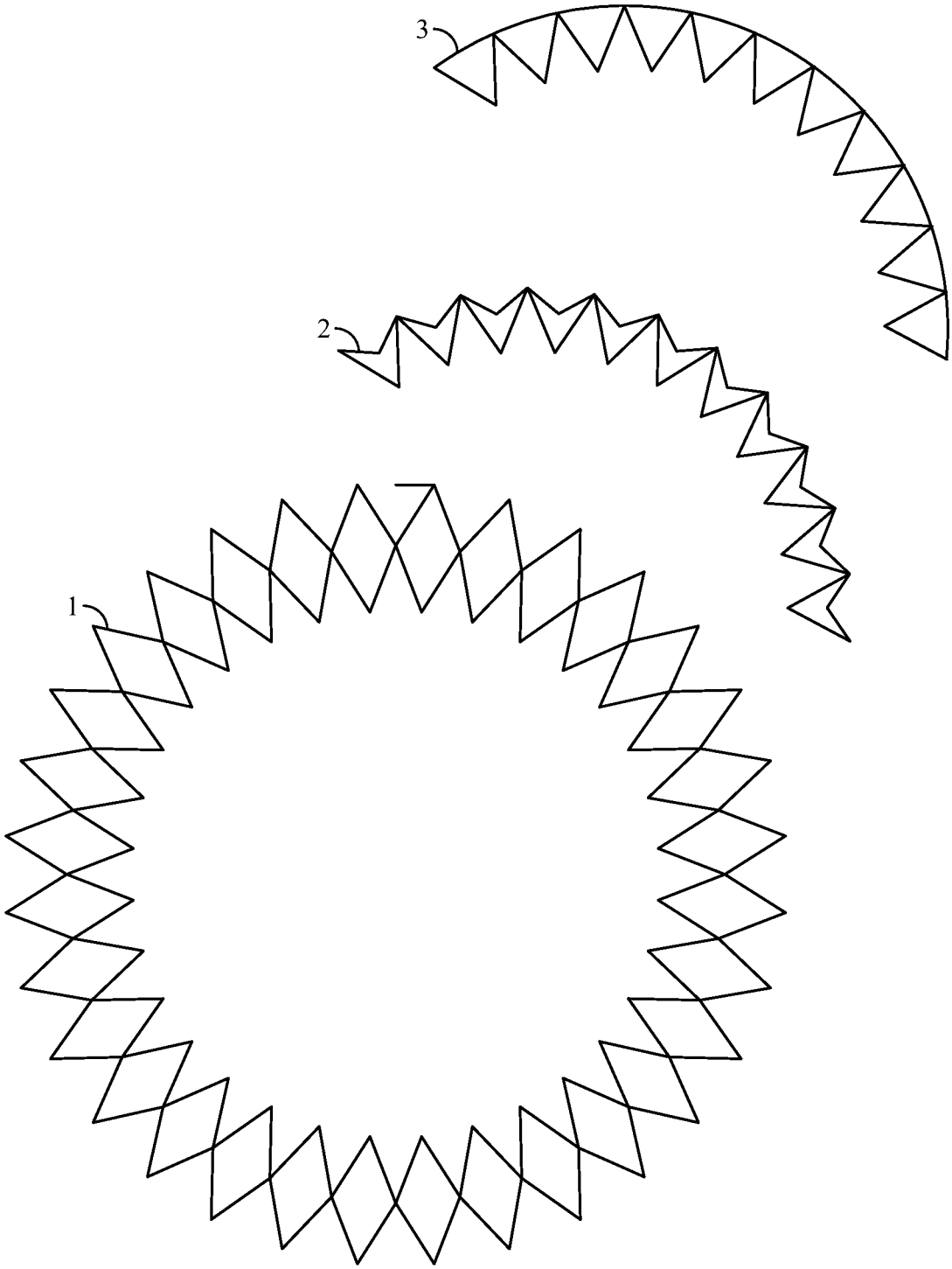
FIG. 52 is a cross-section view of alternative embodiments of the filter media for use with the filter shown in FIG. 51.

In the exemplary embodiment, media 1006 includes a first layer 1008 having a plurality of apertures 1010. A second layer 1012 is positioned under or behind first layer 1008. As is described above, layers 1008 and 1012 can be pleated, waved, planar, of any combination thereof as shown in FIG. 52.

Filter 1000 also includes filter media 1006 that extends between aperture 1002 and/or the aperture seal and cap 1004. In the exemplary embodiment, filter media 1006 is shown as being substantially similar to media 804 shown in FIGS. 42 and 43. However, it should be understood that any of the media designs described in FIGS. 42-50 could be utilized with filter 1000 and/or other cylindrical filters. In some embodiments, filter 1000 is supported with the aperture seal and cap 1004. Alternatively, in some embodiments, filter 1000 is supported with a filter frame positioned within media 1006. Additionally, media 1006 can be supported by a wrap 1014 circumscribing media 1006 to support and/or maintain spacing of pleats as filter 1000 is subjected to and/or undergoes compression. Alternatively, spacers (e.g., beads) can be positioned within pleats to work in conjunction and/or in place of wrap 1014 to support and/or maintain the spacing of the pleats. In operation, dirty flow D is channeled over first layer 1008 and/or apertures 1010. Flow D that is not filtered by layer 1008 is filtered by layer 1012 to produce clean flow C that exits out of filter through aperture 1002.

Figure 53:
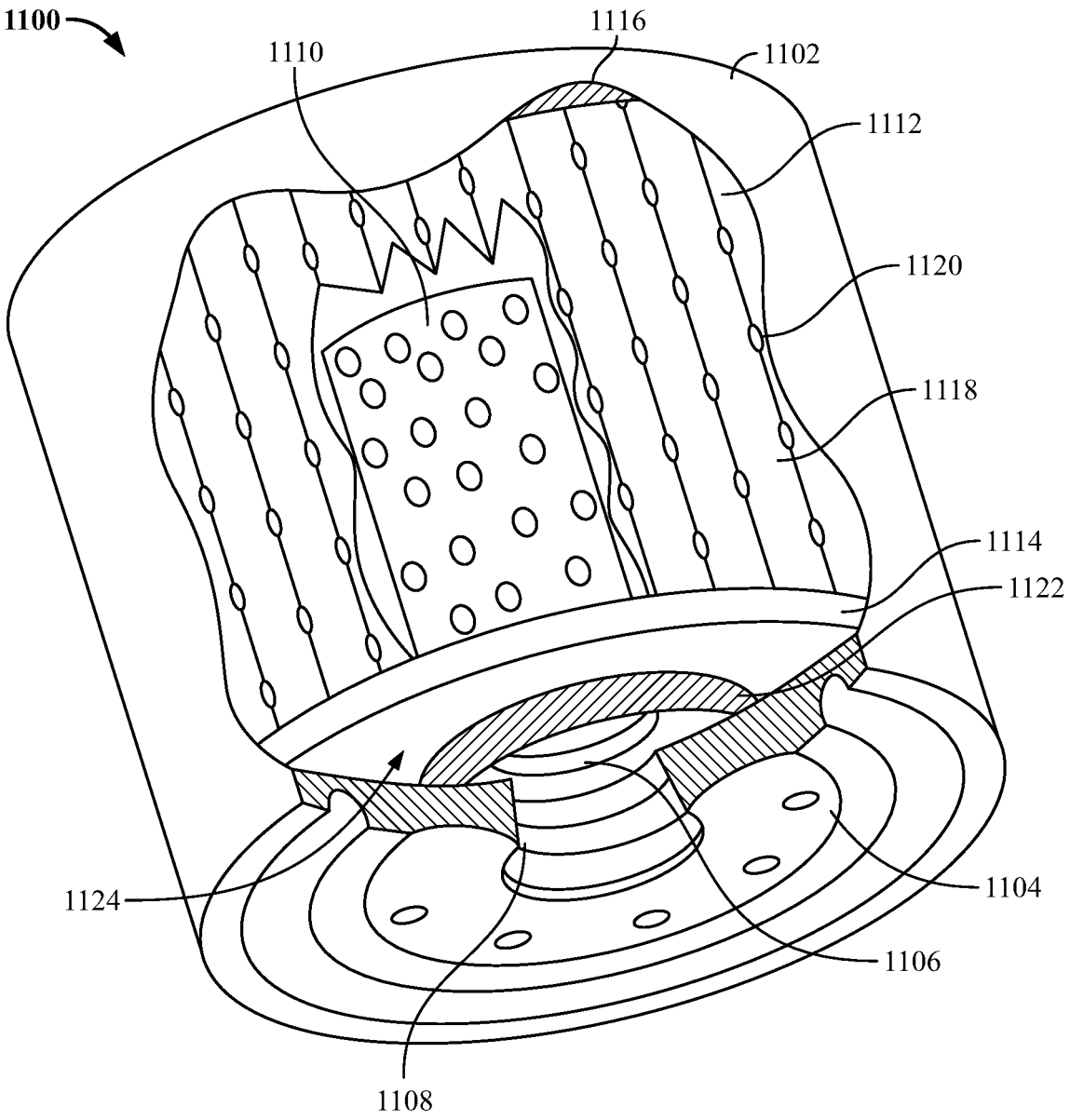
FIG. 53 is a cut-away view of an oil filter 1100 for use with hydraulic machinery.

While filter 1000 is shown as being utilized in a coating air filtration/ventilation system, the cylindrical filters described herein can be utilized in any application that requires filtration through a cylindrical filter including, but not limited to, cement kilns, cement transfer stations, asphalt plants, foundries, lime kilns, coal fired power plant baghouses, fly ash handling, bin vents, wood processing dust collectors, spray driers, aluminum ore processing, steel mills, food processing plants, vacuums (wet/dry, dust collection, sewage, drum, residential, and hazard waste), drinking water systems, pools, spas, and vehicle filtration (transmission, coolant, fuel, gas, and engine oil). To this, FIG. 53 is a cut-away view of an oil filter 1100 for use with hydraulic machinery or vehicles including, but not limited to, internal-combustion engines, aircraft, maritime vessels, gas turbine engines, as well as oil production, transport, and recycling facilities.

In the exemplary embodiment, oil filter 1100 includes a housing 1102 coupled to a base plate 1104. Formed within base plate 1104 is an exit aperture 1106 that is defined by a plurality of threads 1108 for coupling to the desired application. A center tube 1110 extends from base plate 1104 into a cavity within housing 1102. Filter media 1112 circumscribes tube 1110 and is held in position by a lower end cap 1114 and an upper end cap 1116. As described above in regards to alternative cylindrical filters, media 1112 is shown as being substantially similar to media 804 shown in FIGS. 42 and 43. As such, media 1112 includes a first layer 1118 with a plurality of apertures 1120 positioned over a second filter layer (not shown). However, it should be understood that any of the media designs described in FIGS. 42-50 could be utilized. Additionally, an anti-drain back valve 1122 is positioned between lower cap 1114 and baseplate 1104.

In operation, similar to the filtration described above, oil/fluid enters filter 1100 through inlet 1124 and fills the cavity of the filter between media 1112 and housing 1102. The oil/fluid is filtered through the second layer of media 1112 as well as first layer 1118, unless flow entered through apertures 1120. An oil filter such as the one described herein provides a two-stage (e.g., layered) filtration of oil/fluid wherein known oil filters only provide one layer. As such, the unique designs described herein provide for a more efficient, longer lasting, and cost effective filtration solution that can improve environmental waste by preserving being able to filter for longer periods of time.

It should be noted that any of filters described herein can be used with filtration system 100 and also known to be filter or filters 101. In operation, the suction force provided by motor or blower 112 pulls and/or extends back walls 205 and/or 305 away from front faces 204 and/or 304 to maintain an extended configuration of the filter as the frame is retained against a portion of filtration assembly 100. As such, filters 200 and 300 enable the filter to be compressed for ease of transportation and have an expanded configuration without the need of additional materials.

While the examples provided herein are applicable to coating (e.g., paint, stain, powder coat) applications, the filtration systems and/or filters described above can be utilized within any system requiring filtering, including but not limited to ventilation and system including, but not limited to residential and commercial HVAC systems, cement kilns, cement transfer stations, asphalt plants, foundries, lime kilns, coal fired power plant baghouses, fly ash handling, bin vents, wood processing dust collectors, spray driers, aluminum ore processing, steel mills, and food processing plants. Although specific features of various embodiments of the disclosure may be shown in some drawings and not in others, this is for convenience only. In accordance with the principles of the disclosure, any feature of a drawing may be referenced and/or claimed in combination with any feature of any other drawing.

What is claimed is:

1. A filter assembly comprising:

a main filter having an upstream side and a downstream side through which air is configured to flow, the main filter including at least one sidewall comprising filter media and extending between the upstream side and the downstream side, a back wall comprising filter media and disposed at the downstream side of the main filter, wherein the back wall and the at least one sidewall define an interior of the main filter, and an upstream opening defined by the upstream side of the main filter in communication with the interior of the main filter; and a front filter at the upstream side of the main filter, the front filter configured to restrict airflow into the interior of the main filter, the front filter defining an aperture in communication with the interior of the main filter and configured to allow air to bypass the front filter and flow unimpeded therethrough and into the interior of the main filter, wherein the front filter is inverted toward the downstream side of the main filter,

*wherein the back wall of the main filter is convex toward the front filter.*

2. The filter assembly of claim 1, wherein the front filter extends into the interior of the main filter.

3. The filter assembly of claim 2, wherein the aperture of the front filter is at a central location of the front surface.

4. The filter assembly of claim 1, wherein the front filter is removably coupled to the main filter.

[5. The filter assembly of claim 1, wherein the front filter is removably coupled to the main filter by friction.]

[6. The filter assembly of claim 1, wherein the front filter is removably coupled to the main filter by at least one tab.]

[7. The filter assembly of claim 1, wherein the front filter is configured to restrict airflow into the interior of the main filter.]

8. The filter assembly of claim [7] *1*, wherein the front filter is configured to collect particulate in the airflow.

9. The filter assembly of claim 1, wherein the front filter is fabricated from a different material than the main filter.

[10. The filter assembly of claim 1, wherein the back wall and the at least one sidewall form a substantially cube-like shape.]

11. The filter assembly of claim 1, wherein the aperture is sized to comply with requirements of a spray booth.

12. The filter assembly of claim 1, wherein the aperture of the front filter is disposed within the interior of the main filter.

13. The filter assembly of claim 1, wherein the aperture of the front filter has a rectangular shape.

*14. A filter assembly comprising:*

*a main filter having an upstream side and a downstream side through which air is configured to flow, the main filter including a back wall comprising filter media and disposed at the downstream side of the main filter; and*

*a front filter at the upstream side of the main filter, the front filter configured to restrict airflow into the interior of the main filter, the front filter defining an aperture in communication with the main filter and configured to allow air to bypass the front filter and flow unimpeded therethrough and to the main filter,*

*wherein the front filter is inverted toward the downstream side of the main filter,*

*wherein the back wall of the main filter is convex toward the front filter.*

*15. The filter assembly set forth in claim 14, wherein the front filter is configured to enable air to flow therethrough and filter particulate from the air flow.*

*16. The filter assembly set forth in claim 15, wherein the back wall of the main filter is configured to enable air to flow therethrough and filter particulate from the air flow.*

*17. The filter assembly set forth in claim 14, wherein the aperture includes a plurality of apertures.*

*18. The filter assembly set forth in claim 14, wherein the front filter and the main filter are coupled to one another.*

*19. The filter assembly set forth in claim 14, further comprising a frame to which the front filter and the main filter are coupled.*

* * * * *